United States Patent
Fukushima et al.

(10) Patent No.: US 7,151,617 B2
(45) Date of Patent: Dec. 19, 2006

(54) IMAGE SYNTHESIZING APPARATUS

(75) Inventors: Osamu Fukushima, Tokyo (JP); Shuji Kuhara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 885 days.

(21) Appl. No.: 10/050,097

(22) Filed: Jan. 18, 2002

(65) Prior Publication Data
US 2002/0097250 A1    Jul. 25, 2002

(30) Foreign Application Priority Data
Jan. 19, 2001    (JP)    ............................. 2001-012475

(51) Int. Cl.
*G06K 15/02*    (2006.01)
*G06F 3/12*    (2006.01)
*G06F 15/00*    (2006.01)

(52) U.S. Cl. .................. 358/1.16; 358/1.1; 358/1.2; 358/1.9; 358/1.18; 705/24

(58) Field of Classification Search ............... 358/1.13, 358/538, 140; 399/6, 194, 147; 345/629
See application file for complete search history.

(56) References Cited

U.S. PATENT DOCUMENTS 5,469,536 A * 11/1995 Blank .......................... 345/594
5,920,685 A * 7/1999 Romano et al. ........... 358/1.15
6,222,637 B1    4/2001 Ito et al.
2004/0223168 A1* 11/2004 Haneda et al. .............. 358/1.1

\* cited by examiner

*Primary Examiner*—King Y. Poon
*Assistant Examiner*—Thomas J. Lett
(74) *Attorney, Agent, or Firm*—Birch, Stewart, Kolasch & Birch, LLP

(57) ABSTRACT

There is disclosed an image synthesizing device that is provided with a mode switching device for switching over between an overlay mode and an inlay mode. In the overlay mode, image data of a subject image is input into a memory in a size corresponding to a designated print size of a composite image, and at least an additional image is overlaid on a predetermined portion of the subject image. So the composite image having a simple structure will be produced promptly in the overlay mode without the need for complicated operations. In the inlay mode, a mount area is defined in the memory in correspondence with a designated print size of a composite image, and the subject image and at least an additional image are inlaid in those ranges which are defined in variable sizes at appropriate locations within the mount area.

9 Claims, 32 Drawing Sheets

FIG.9

[DESCRIPTION]
   TEMPLATE_NAME="TOURIST PHOTO 1"
   TEMPLATE_NUMBER=KK-001-L
   GROUP=" TOURIST PHOTOGRAPHY"
   TEMPLATE_SIZE=1270, 890
   THUMBNAIL_FILE=KK-001-L-TM.BMP

[COMPOSITION]
   TEMPLATE_TYPE=0
   INLAYING SEQUENCE_TYPE=0
   PICTURE FRAME_NUMBER=1
   IMAGE_NUMBER=1
   CHARACTER FRAME_NUMBER=1
   BACKGROUND_COLOR=255, 255, 255

[PICTURE_FRAME 1]
   PICTURE FRAME_ADDRESS=118, 88
   PICTURE FRAME_SIZE=590, 322
   MASK_FILE=KK-001-L-M.pcx

[IMAGE 1]
   IMAGE_FILE=KK-001-L-D.pcx
   IMAGE_ADDRESS=767, 88

[CHARACTER_FRAME 1]
   CHARACTER FRAME_ADDRESS=118, 500
   CHARACTER FRAME_SIZE=590, 100
   FONT_SIZE=20
   FONT_COLOR=0, 0, 0
   BACKGROUND_COLOR=255, 255, 120
   BACKCLEAR=1

< IMAGE PROCESSING (INLAY) >

< IMAGE PROCESSING (OVERLAY) >

IMAGE SYNTHESIZING APPARATUS

BACKGROUND OF THE INVENTION

1. Field of the Invention

The present invention relates to an image synthesizing apparatus that uses templates for synthesizing images.

2. Background Arts

A digital print system has been used in practical, that picks up image data photoelectrically from pictures on a photographic film, processes the image data in a digital image processing method, and prints an image on a photosensitive material by projecting light beams in accordance with the processed image data.

An image synthesizing method using such a digital print system has also been known in the art, wherein an image of a photographic picture is synthesized with an additional or ornamental image to produce a composite image, and the composite image is printed as a greeting card or the like. There are a variety of additional images prepared for the image synthesizing, including ornamental patterns, framing images, and calligraphic images.

For the image synthesizing, the digital print system is installed with a software program for the image synthesizing. Then an image synthesizing mode is added to the digital print system. In the image synthesizing mode, a control menu is displayed on a screen, for the operator to enter necessary commands for the image synthesizing on the control menu. As the commands, the user may designate a subject image and an additional image or a caption to synthesize with the subject image, as well as synthetic conditions, including the respective sizes and locations of the subject image, the additional image and the caption.

A mount area is defined on the control menu, and the images and the characters may be synthesized with one another in an appropriate layout on the mount area by operating a console consisting of a mouse and a keyboard. As having a large flexibility in the layout of the synthesized images, this method is advantageous in synthesizing a complicated composite image.

According to this image synthesizing method, however, it takes a certain number of operation procedures to produce a composite image and thus a pretty long time to print the individual composite image even where the layout of the expected composite image is very simple, e.g. where the same framing image or the same illustration is to be superimposed on the same location of a plurality of pictures.

SUMMARY OF THE INVENTION

In view of the foregoing, an object of the present invention is to provide an image synthesizing apparatus that permits producing complicated composite images as well as uncomplicated composite images, and simplifies the operations necessary for producing and printing the uncomplicated composite images.

To achieve the above and other objects, the present invention provides an image synthesizing apparatus for synthesizing a subject image with at least an additional image to produce a composite image, the image synthesizing apparatus comprises an image input device for inputting image data of the subject image into a memory; an image processing device for processing the image data to synthesize the subject image with at least an additional image; and a mode switching device for switching over the image synthesizing apparatus between an overlay mode and an inlay mode, wherein, in the overlay mode, the image data of the subject image is input into the memory in a size corresponding to a designated print size of the composite image, and at least an additional image is overlaid on a predetermined portion of the subject image, whereas, in the inlay mode, a mount area is defined in the memory in correspondence with a designated print size of the composite image, and the subject image and at least an additional image are inlaid in those ranges which are defined in variable sizes at appropriate locations within the mount area.

Since the image synthesizing device of the present invention is provided with the mode switching device for switching over between the overlay mode and the inlay mode, the user can not only produce complicated composite images in the inlay mode, but also produce simple composite images promptly in the overlay mode without the need for complicated operations.

According to a preferred embodiment, the image processing device processes the image data of the subject image on the basis of a template selected from among a plurality of templates. The templates comprise templates which are prepared in correspondence with a plurality of kinds of additional images available in the overlay mode, and templates for use in the inlay mode each of which is produced for each composite image to define the print size of the composite image, and the sizes and locations of the subject image and at least an additional image within the composite image.

The additional images available for the overlay mode preferably comprise those images which are each constituted of a transparent portion for partly exposing the subject image and an ornamental image portion to be superimposed on the subject image.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 9 shows an explanatory diagram illustrating an example of data written in the synthesizing data file;

DETAILED DESCRIPTION OF THE EMBODIMENTS

Figure 1:
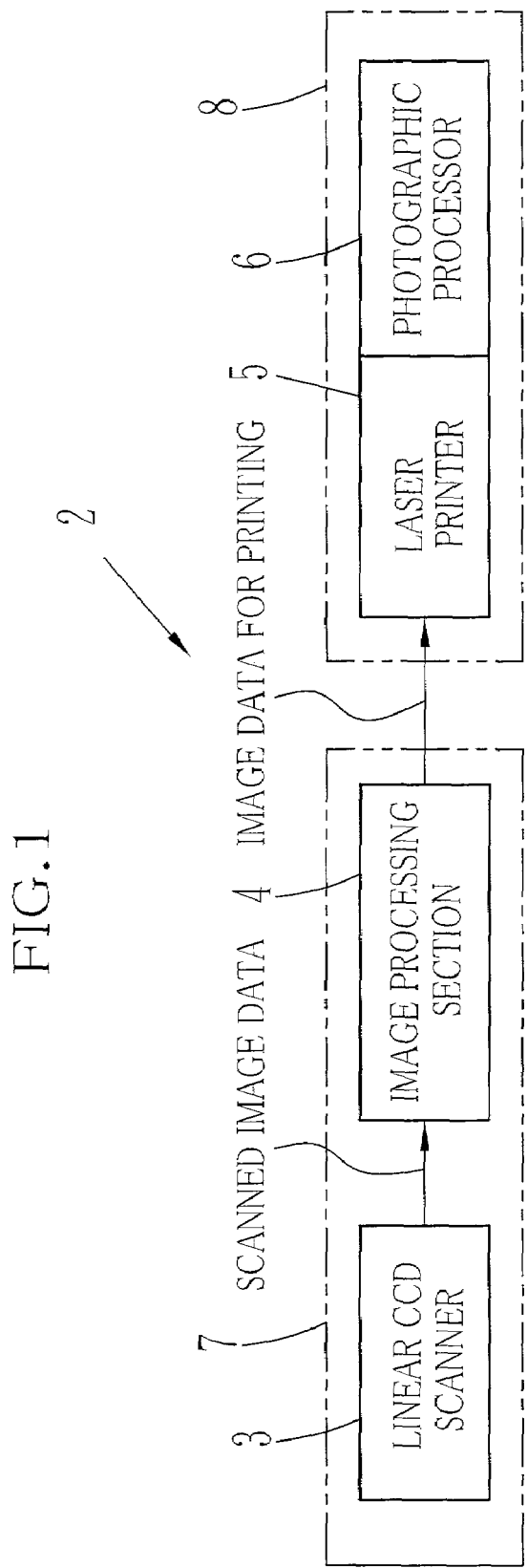
FIG. 1 shows a block diagram of a digital print system according to an embodiment of the present invention.

A digital print system 2 shown in FIG. 1 is constituted of a linear CCD scanner 3, an image processing section 4, a laser printer 5 and a photographic processor 6. The linear CCD scanner 3 and the image processing section 4 are integrated into an input unit 7, whereas the laser printer 5 and the photographic processor 8 are integrated into an output unit 8.

The digital print system 2 is provided with an ordinary print mode and a composite print mode. In the ordinary print mode, the scanner 3 scans pictures on a photo filmstrip as placed in a film carrier, and an image signal from the scanner 3 is converted into digital image data through an A/D converter. The scanner 3 carries out pre-scanning at a low resolution before making fine-scanning at a higher resolution. The image data obtained through the pre-scanning is used for displaying a preview image, whereas the image data obtained through the fine-scanning is used for printing an image. The image processing section 4 processes the image data of the photographic pictures for image correction and the like, and sends the processed image data to the output unit 8.

The laser printer 5 consists of a laser exposing device, a paper transport device and a paper magazine containing color photographic paper. The laser device scans across a main scan direction of the color photographic paper with a laser that is modulated on the basis of the image data, as the paper transport device transport the photographic paper in a sub scan direction perpendicular to the main scan direction, to record a latent image line by line on the photographic paper. The photographic processor 6 processes the photographic paper to develop the latent image into a visible positive image.

The laser exposing device is a well-known unit consisting of three laser projecting sections for red, green and blue, a polygon mirror, an F$\theta$ lens, reflection mirrors and other elements. The laser printer 5 may be provided with a number of paper magazines containing different widths of photographic papers, so as to select one from among these photographic papers.

In the composite print mode, the image data of a photographic image obtained through the scanner 3 is processed not only for image correction, that is executed the same way as in the ordinary print mode, but also for synthesizing the photographic image with an additional image or a text, to produce a composite image. The composite image is printed in the output unit 8 the same way as in the ordinary print mode.

In this embodiment, the laser printer 5 has an output resolution of 300 dpi, so the total pixel number of the printed image is determined by the print size. The scanner 3 is provided with a function to control the number of pixels of the scanned picture at the fine-scanning. In the ordinary print mode, the pixel number of the scanned picture is adjusted to the size of the finished print. In the composite print mode, the pixel number of the scanned picture is adjusted to the size of a print area in which the photographic picture is to be printed, because the photographic print constitutes a fragment of the finished print in the composite print mode.

Since the size of the image data of the scanned picture is already adjusted to the print size, it is unnecessary to adjust the image size when producing the printing image data from the scanned image data, that would otherwise be necessary to carry out by decimation, interpolation or the like. Thus, the time taken for the image processing is saved.

Figure 2:
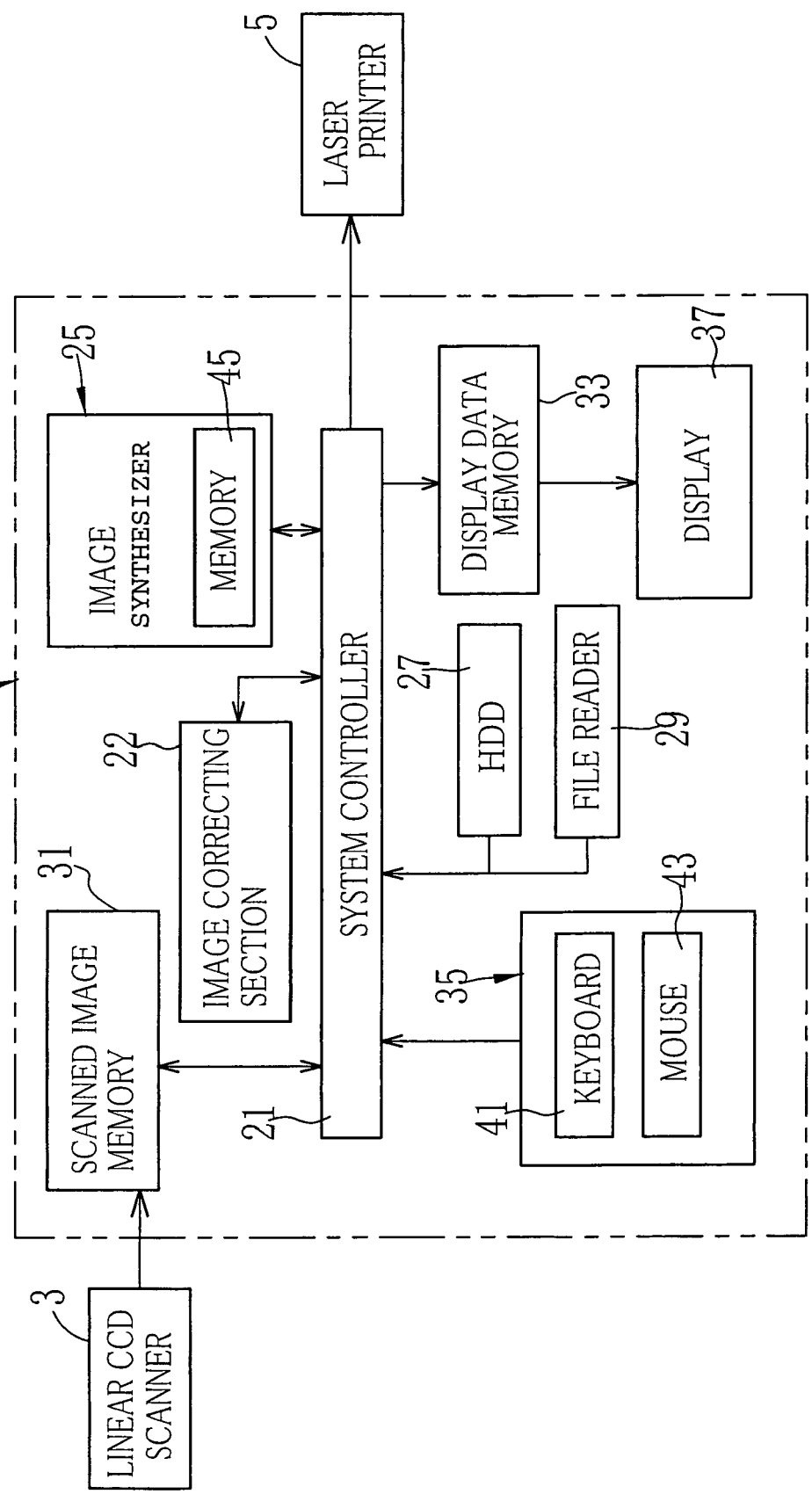
FIG. 2 shows a block diagram of an image processing device of the digital print system of FIG. 1.

As shown in FIG. 2, the image processing section 4 is constituted of a system controller 21, an image correcting section 22, an image synthesizer 25, a hard disc drive (HDD) 27, a file reader 29, a scanned image memory 31, a display data memory 33, a command input device 35 and a display 37. The system controller 21 is mainly constituted of a CPU, ROM and RAM, and controls respective operations in the image processing section 4, and executes an image processing program for image correction or synthesizing. The scanner 31 is a frame memory for storing the image data obtained through the scanner 3. The image correcting section 22 processes the image data for color correction, density correction, soft-focusing, moiré elimination and the like. The display data memory 33 is used for displaying the scanned picture or control menus on a display 37.

The image processing section 4 adopts GUI (Graphical User Interface), so various commands are fed in the system controller 21 by operating the command input device 35 while displaying the operation menus. The image processing section 4 doubles as a controller for the whole digital print system 2. Accordingly, commands for the scanner 3 or the laser printer 5 are also entered through the command input device 35. In this embodiment, the command input device 35 includes a keyboard 41 and a mouse 43.

The image synthesizer 25 processes the image data for synthesizing the scanned picture with an additional image or a text. The image synthesizer 25 is provided with a synthesizer memory 45 for image synthesizing. The composite print mode includes an inlay mode and an overlay mode. In either mode, however, previously prepared templates are used for synthesizing.

In the inlay mode, conditions for image synthesizing, including the size and the location of the scanned picture inside the composite image, may be set up by the user. In the overlay mode, on the other hand, the size of the scanned picture is determined by the print size of the composite image, and the additional image, such as an ornamental frame, is just overlaid on the scanned picture. Indeed flexibility in the layout and arrangement of the composite image is limited, the overlay mode needs less operations than the inlay mode. Accordingly, the inlay mode is suitable for such cases where the user's requirements for image synthesizing are particular, and the overlay mode is suitable for such cases where the user's requirements are simple.

Figure 3:
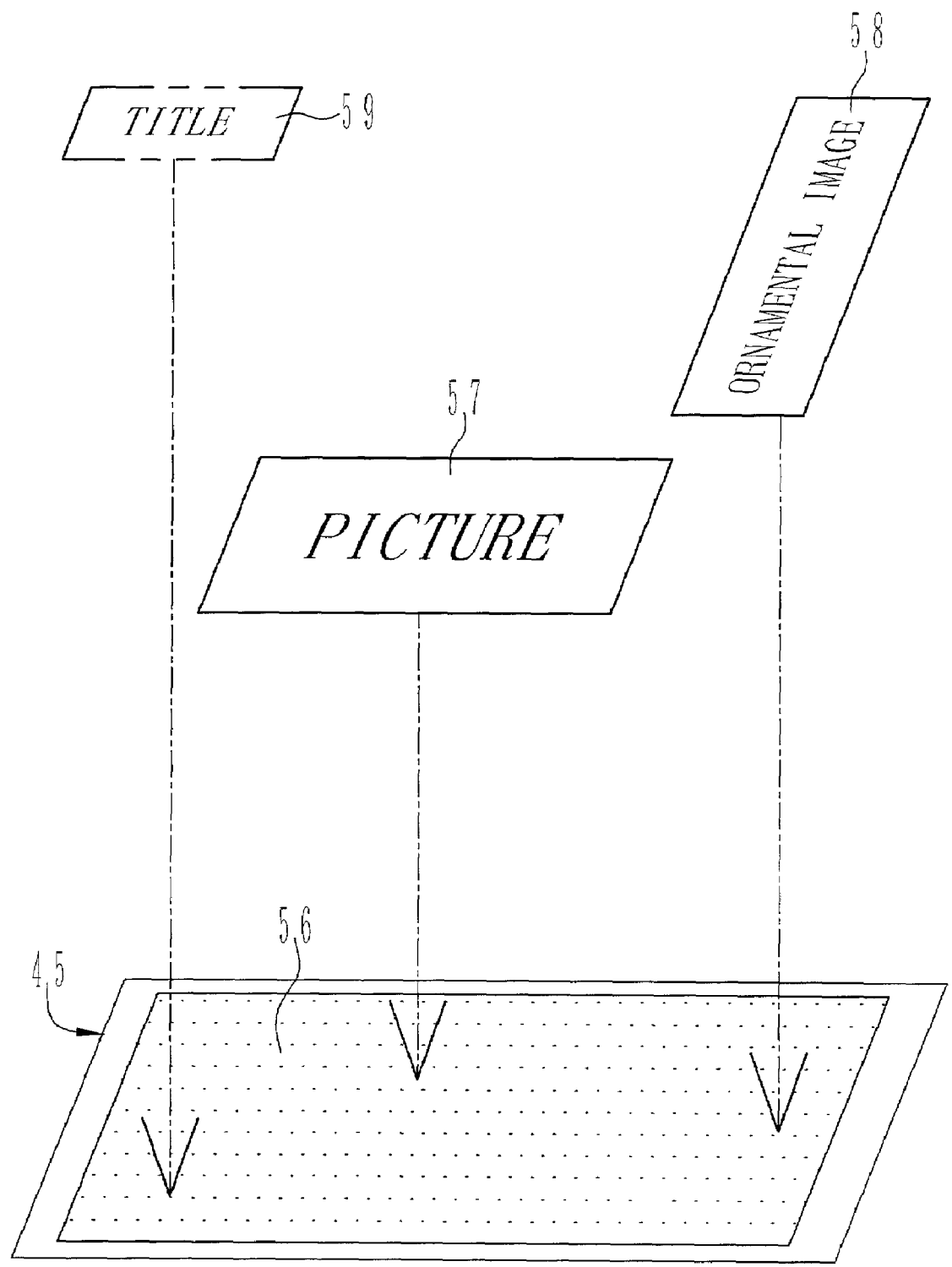
FIG. 3 shows a conceptual diagram illustrating an inlaying method.

In the inlay mode, as shown in FIG. 3, a mount area 56 is defined on the synthesizer memory 45 of the image synthesizer 25 in correspondence with the print size of a finished composite print, and then a plurality of graphic images, e.g. a scanned picture 57 and an ornamental image 58, or characters, e.g. a title 59, are inlaid in variable sizes at appropriate locations in the mount area 56.

Figure 4:
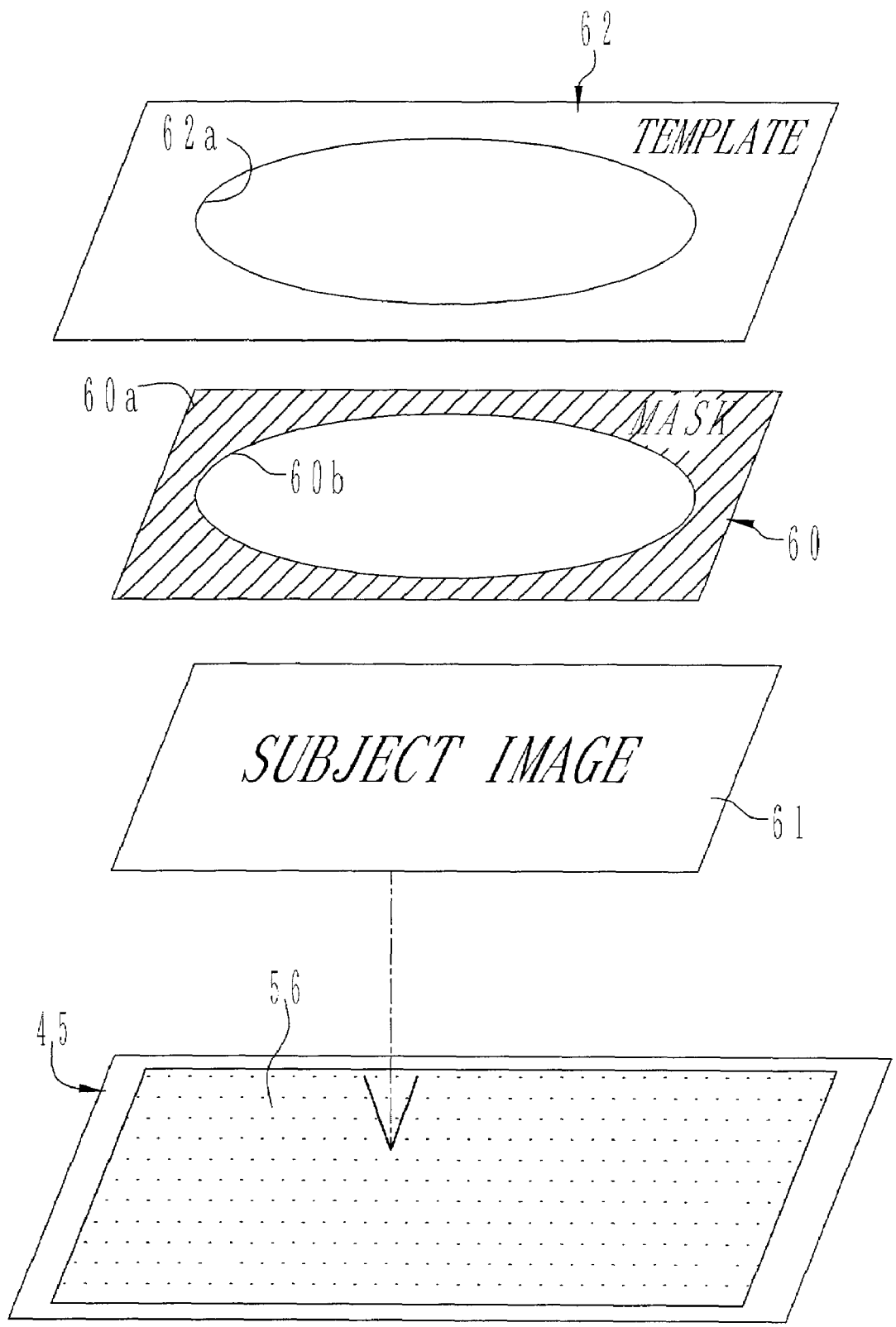
FIG. 4 shows a conceptual diagram illustrating an inlaying method using a mask image.

It is also possible to modify the contour of a scanned picture 61 in accordance with an inlaying range 62a of a template image 62, as shown in FIG. 4. Since the scanning is done by the scanner 3 two-dimensionally in the main and sub scan directions, the scanned picture 61 inevitably has a rectangular shape. To shape the scanned picture 61 into another contour that corresponds to the inlaying range 62a of the template image 62, a mask image 60 consisting of a masking portion 60a and an opening 60b having the same shape and size as the inlaying range 62a is superposed or overlaid on the scanned picture 61, so the marginal portion of the scanned picture 61 is masked out by the masking portion 60a, and merely a center portion of the scanned picture 61 is exposed through the opening 60b. As a result, the scanned picture 61 is virtually trimmed into the shape given by the opening 60b. The trimmed image is then inlaid in the inlaying range 62a of the template image 62. If, for example, the template image 62 is an ornamental frame, the scanned picture 61 looks like being placed in the ornamental frame 62.

Such mask images are prepared for a variety of shapes of available inlaying range, and are stored in association with the related template images. The respective inlaying template includes print size data of the composite image and layout data of the scanned picture and the ornamental image.

A synthesizing data file is included in the data constituting the inlaying template, and defines the contents of the inlaying template. Where an ornamental image or a mask image is used in the inlaying template, data of the ornamental image or data of the mask image is included in the data constituting the inlaying template.

The synthesizing data file is a file containing data of the print size of the composite image that is equivalent to the size of the mounting area 56, the number of inlaying ranges into which the scanned picture or the characters may be inlaid, the respective sizes and locations of the inlaying ranges, and so forth. Where an ornamental image or a mask image is used in the inlaying template, the synthesizing data file designates an ornamental image file of the used ornamental image, and the inlaying position of the ornamental image.

Figure 5:
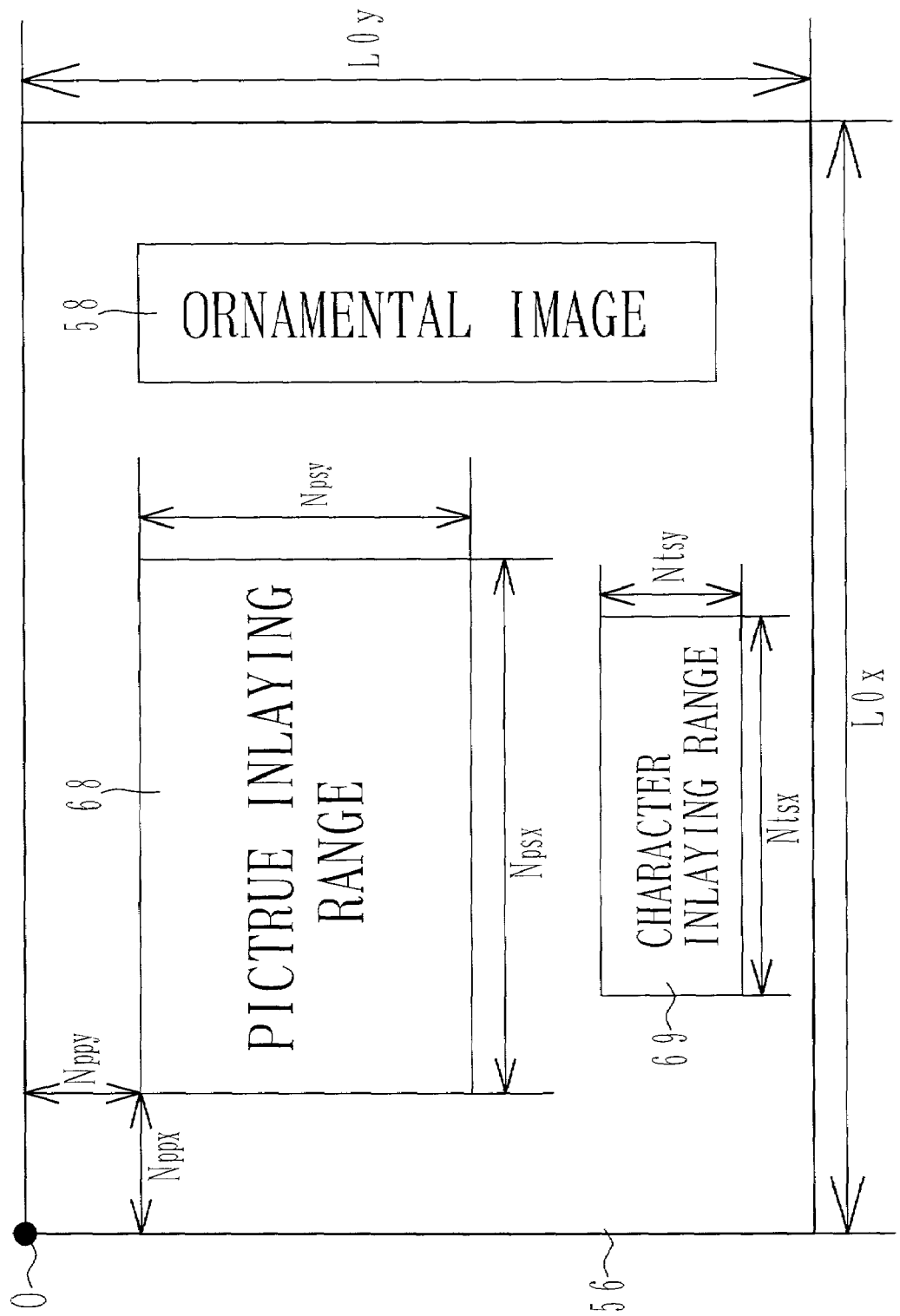
FIG. 5 shows an explanatory diagram illustrating a method of designating the size and location of inlaying ranges within a mount area.

For example, as shown in FIG. 5, the print size is defined by side lengths L0x and L0y of the rectangular mount area 56. Hereinafter, the size of a picture inlaying range 68 is defined by the pixel numbers Npsx and Npsy in the lengthwise and widthwise directions of the mount area 56 respectively. In accordance with the pixel numbers Npsx and Npsy, the scanner 3 controls the number of pixels to pick up from an original. Therefore, it is unnecessary to adjust the size of the scanned picture to the inlaying range after the scanning that would otherwise be necessary to carry out by decimation, interpolation or the like.

The location of the picture inlaying range 68 is defined by the pixel numbers Nppx and Nppy from an origin 0 of the mount area 56 to an upper left corner of the inlaying range 68. The size and location of a character inlaying range 69 are defined by the numbers of pixels in the same way as for the picture inlaying range 68. Since the ornamental image 58 is sorted out while taking its size into consideration, the inlaying location alone is defined by the numbers of pixels from the origin 0, without defining the size. On the basis of the layout data defined by the synthesizing data file, the ornamental image, the captions and the scanned picture are synthesized.

Figure 6:
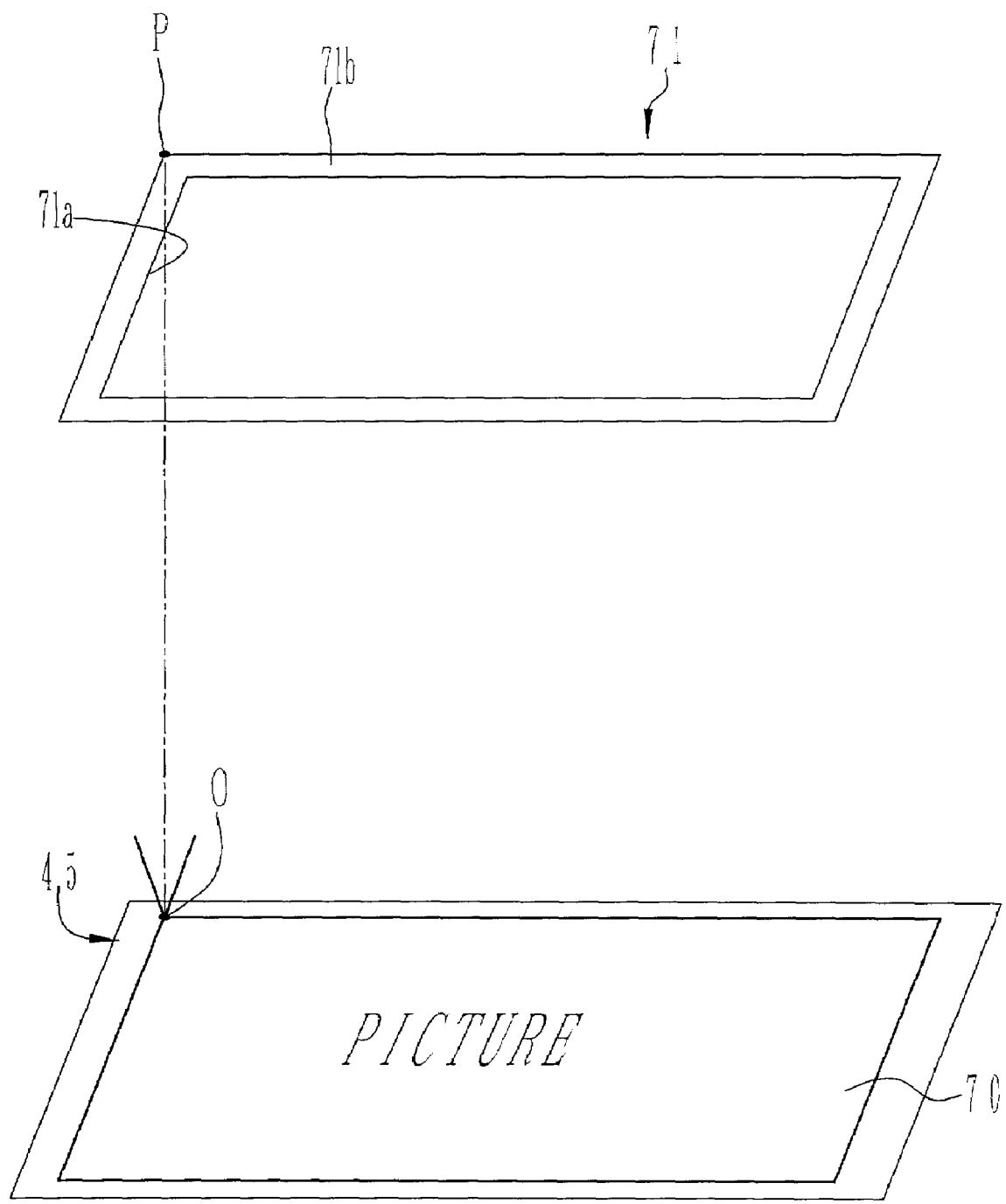
FIG. 6 shows a conceptual diagram illustrating an overlaying method.

In the overlay mode, on the other hand, an image 70, e.g. a photographic image, is read into the synthesizer memory 45 of the image processing device 4 in a size corresponding to the print size, as shown in FIG. 6. Then an additional image, e.g. an ornamental framing image 71, is overlaid on the scanned picture 70. For the overlaying is used an overlaying template, which is selected from among predetermined options, including various ornamental framing images. Each of the framing images consists of a center opening 71a and a frame portion 71b having an ornamental image thereon. The opening 71a may be called a transparent portion in terms of the image data. The framing image 71 is made equal in size to the scanned picture 70, i.e., to the print size of the composite image. When the framing image 71 is overlaid on the scanned picture 70 with its reference point P on an origin 0 of the scanned picture 70, the frame portion 71b is superimposed on the scanned picture 70, and the scanned picture 70 is partly exposed through the opening 71a. As a result, the scanned picture 70 looks like being framed in the frame portion 71b.

Like the inlaying template, an overlaying template includes a synthesizing data file that defines the contents of the template. However, since the location, the size and the layout of the framing image 71 on the scanned picture 70 is predetermined in the overlay template, the synthesizing data file does not include data of the location, size and layout of the framing image 71, but just includes the name of the framing image 71.

The overlaying templates are not only provided for overlaying the ornamental framing image but also for superposing characters. As for a fixed caption, like "A Happy New Year" or "Merry Xmas", it is possible to prepare such a caption as an image. In that case, the caption is set up as an ornamental image, so it is impossible to replace that caption with other characters. To overlay appropriate characters on the scanned image, the location and size of a character inlaying range for these characters should be defined in the synthesizing data file in the same way as for the inlaying template.

A wide variety of templates are prepared as the inlaying templates and the overlaying templates. For example, as the inlaying templates, there are templates for calendars, templates for 3D (three-dimensional) images, templates for albums, templates for tourist photography, templates for post cards especially for greeting cards etc. The overlaying templates are also prepared in accordance with different kinds of framing images. The templates are also prepared for different print sizes, e.g. for post card size, A4 size, or the like.

Figure 7:
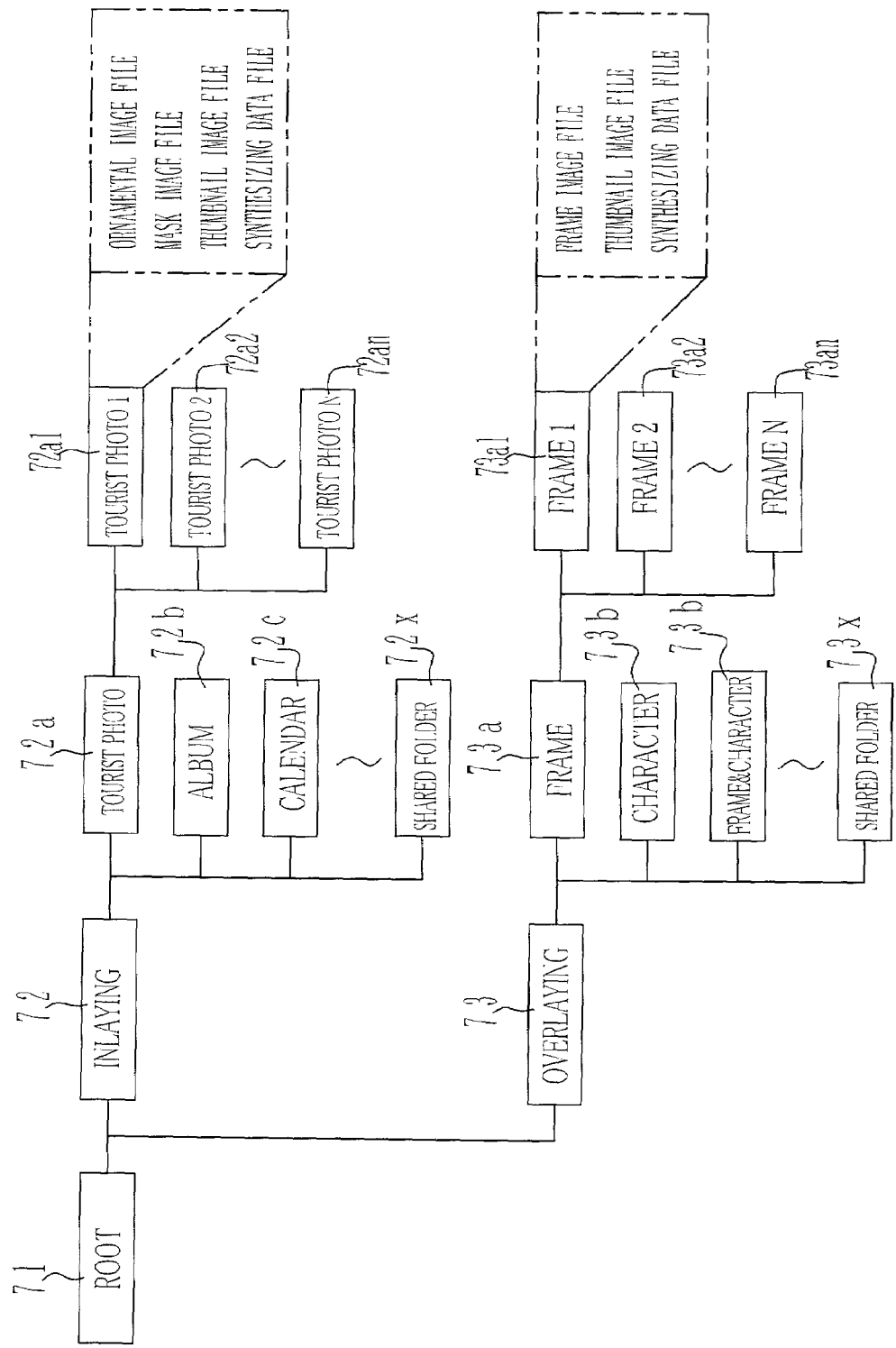
FIG. 7 shows a block diagram illustrating a folder storing template data.

The HDD 27 stores various kinds of software programs, including application software, like an image processing program, and device driver software, and data of the different kinds of templates. The file reader 29 reads out a file from an external storage medium, like a compact disc (CD) or a floppy disc (FD). The software programs and the template data are provided in the form of a file written on the external storage medium, and are read out through the file read 29 to install or register it into the image processing device 4. As shown in FIG. 7, an inlaying data folder 72 and an overlaying data folder 73 are produced as subsidiary folders to a root folder 71 of the HDD 27. The data of the inlaying templates are stored in the inlaying data folder 72, whereas the data of the overlaying templates are stored in the overlaying data folder 73.

The data of the inlaying templates are classified into a number of groups according to the application field or another category, and a corresponding number of folders are provided for storing the templates of the same group in one folder. For example, there are provided a tourist photography folder 72a, an album folder 72b, a calendar folder 72c, a 3D image folder 72d and a post card folder 72e. A shared folder 72x stores those files which are used generally in the templates of the respective groups.

Inside the respective folders 72a to 72e are provided a plurality of subfolders. For instance, subfolders 72a1, 72a2 . . . 72aN (N=an integer) are contained in the tourist photography folder 72a, each subfolder storing data of a different kind of template for tourist photography. In this embodiment, data of the template for the inlaying includes an ornamental image file, a synthesizing data file, a thumbnail image file and a mask image file. The thumbnail image file is an image file for use in displaying an image of the template on the display 37. Among the data constituting the template, the synthesizing data file is essential, and other files are selectively contained depending upon the content of the template. For example, as for a template that does not use an ornamental image, the ornamental image file is omitted. Likewise, the mask image file or the thumbnail image file may be omitted if it is not needed.

On the other hand, data of the overlaying templates are classified into a frame synthesizing group, a frame and character synthesizing group, a character synthesizing group and so forth, and are stored group by group in a frame synthesizing folder 73a, a frame and character synthesizing folder 73b, a character synthesizing folder 73c and so forth, which are contained in the overlaying data folder 73. Also a shared folder 73x is contained in the overlaying data folder 73, like the shared folder 72x in the inlaying data folder 72. Inside the respective folders 73a to 73c are provided a plurality of subfolders. For instance, subfolders 73a1, 73a2 . . . 73aN (N=an integer) are contained in the frame synthesizing folder 73a, each subfolder storing data of a different kind of templates for overlaying. In this embodiment, data of the overlaying template includes an ornamental image file, a synthesizing data file and a thumbnail image file. Among the data constituting the template, the synthesizing data file is essential, and other files are selectively contained depending upon the content of the template.

Figure 8:
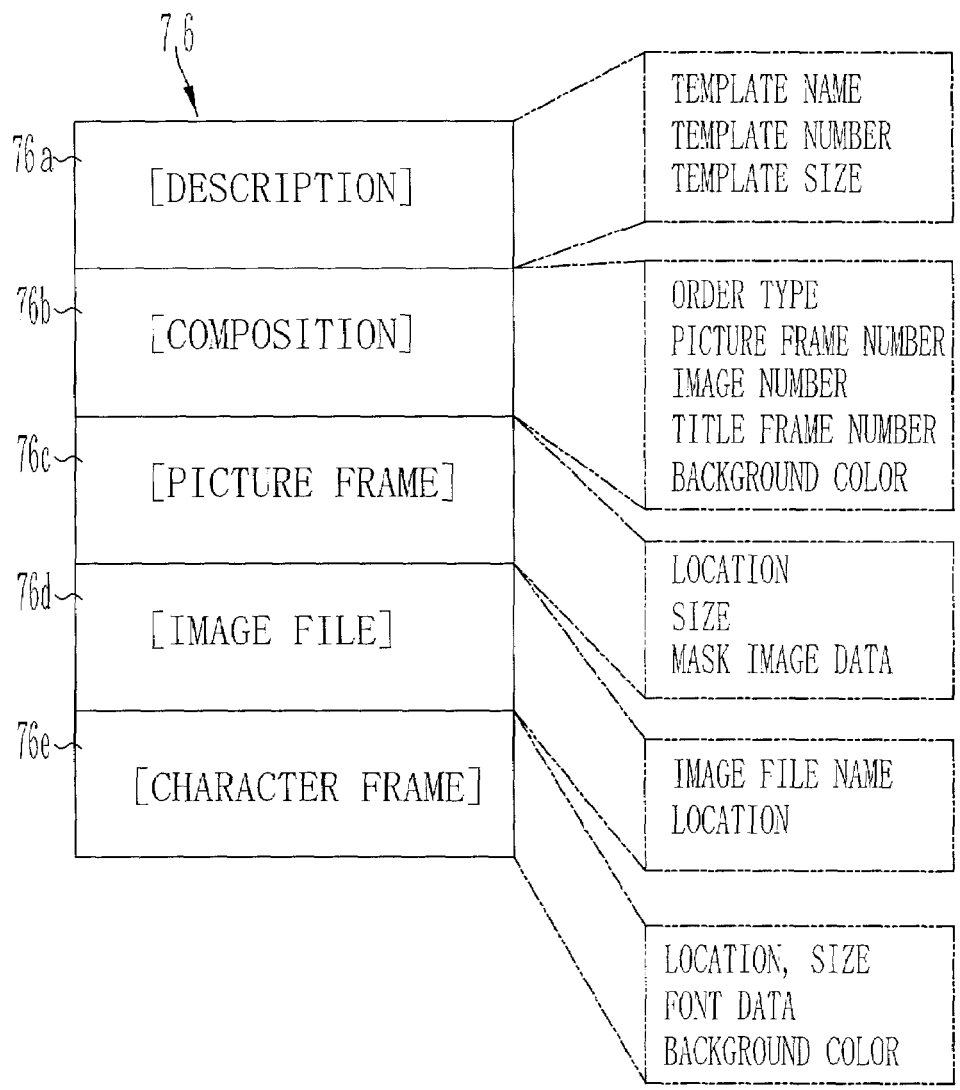
FIG. 8 shows a block diagram illustrating a synthesizing data file for the inlaying.

FIG. 8 shows a concept of data structure of a synthesizing data file 76 for an inlaying template for synthesizing a scanned picture, an ornamental image, a mask image and a caption. FIG. 9 shows an example of data contents in the synthesizing data file 76. The synthesizing data file 76 is provided with a description data section 76a "DESCRIPTION", and a composition data section 76b "COMPOSITION". The description data section 76a stores a template name and a template number. In this example, the template name is "TOURIST PHOTO 1" and the template number is "KK-001-L". The template name and the template number are displayed in the operation menu, and is used as identification data on the selection of a template. The description data section 76a also stores a name of the group of the template. The template of this example belongs to the tourist photography group, so the group name "TOURIST PHOTOGRAPHY" is depicted.

The description data section 76a further stores a template size that corresponds to the print size. In this example, the template size "1270, 890" indicates that the print size is 127.0 mm×89.0 mm. The thumbnail image file is formed in a bitmap style, but may be formed in a JPEG style or a TIFF style.

The composition data section 76b stores a kind of synthesis "TEMPLATE TYPE", the sequence of inlaying "INLAYING SEQUENCE TYPE", the number of picture inlaying ranges "PICTURE NUMBER", the number of ornamental images "IMAGE NUMBER", the number of character inlaying ranges "CHARACTER FRAME NUMBER, and a background color "BACKGROUND COLOR".

The sequence of inlaying may be determined either in accordance with or independently of the sequence of scanning the pictures. In default, this data item is set at "0", which means that the scanned pictures are inlaid one after another in the inlaying ranges sequentially from the low numbered one. When the data item "INLAYING SEQUENCE TYPE" is set at "1", the scanned pictures are inlaid respectively in those inlaying ranges which have the same serial numbers as the frame serial numbers assigned to these pictures on the photographic filmstrip, independently of the sequence of scanning the pictures. When, for example, an index print is to be made, the data item "INLAYING SEQUENCE TYPE" is set at "1". As the background color, tonal grades of red, green and blue are designed respectively in 256 steps, so that 16,700,000 color variations may be reproduced.

The presence and the number of a picture inlaying range data section 76c "PICTURE", an ornamental image data section 76d "IMAGE FILE", and a character inlaying range data section 76e "CHARACTER" depend upon the designation in the composition data section 76b. Since a single picture inlaying range, a single ornamental image and a single character inlaying range are designated in this example, one picture inlaying range data section 76c, one ornamental image data section 76d and one character inlaying range data section 76e are provided.

The picture inlaying range data section 76c stores the pixel numbers representative of the size and location of the picture inlaying range, in the manner as set forth above. Data relating to the mask image, like the name of the mask image file, is also written in this section 76c. The number of copies of the same photographic picture within a template is also written in this section 76c. For example, where there are two picture inlaying ranges in a template, and the same picture is to be inlaid in these ranges, the number of copies of that picture is "2".

The ornamental image data section 76d stores the name and the inlaying location of the ornamental image. The character inlaying range data section 76e stores the size and location of the character inlaying range, font data of the inlaid characters, and the background color of the character inlaying range. The font data includes front size and front color. The font data may include font type, front style, and designation to a particular treatment, like anti-alias treatment.

Figure 10:
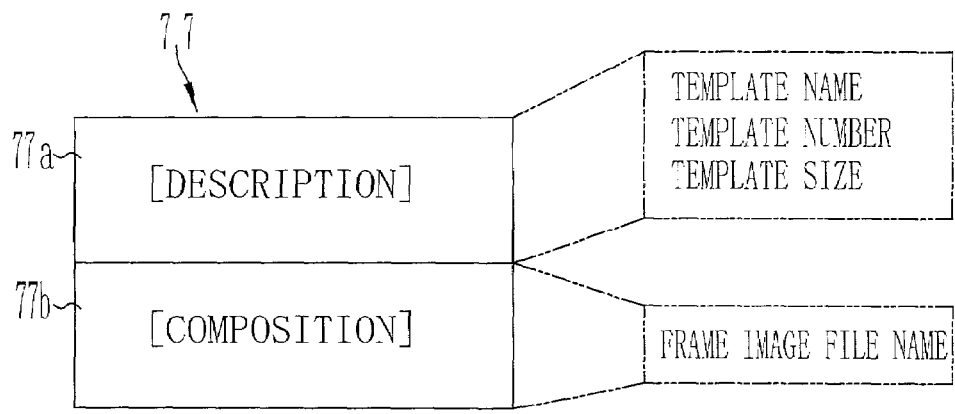
FIG. 10 shows a block diagram illustrating a synthesizing data file for the overlaying.

On the other hand, as shown in FIG. 10, a synthesizing data file 77 for the overlaying consists of a description data section 77a and a composition data section 77b. The description data section 77a stores the same data items that are written in the description data section 76a of the synthesizing data file 76 for the inlaying. The composition data section 77b designates a file name of a framing image. Since the location to synthesize the framing image is fixed, there is no designation of the location.

Besides the above mentioned data items, many appropriate data items may be designated in these synthesizing data file 76 and 77. Especially in the synthesizing data file 76 for the inlaying, the user is allowed to modify the size of the picture inlaying range and the layout of the respective inlaying range and the ornamental image. Thus, it is possible to produce a template for an intended composite image by editing the synthesizing data file 76. The synthesizing data files 76 and 77 are produced as a text file, so that the user may easily edit the synthesizing data file 76 or 77 by use of a text editor or word processing software, to customize a template.

As described so far, the flexibility of designation or edition in the synthesizing data file 77 for the overlaying is less than that for the inlaying. But it takes less time for the overlaying. Therefore, the user can choose between the inlay mode and the overlay mode depending upon the requirements for the composite image.

Figure 11:
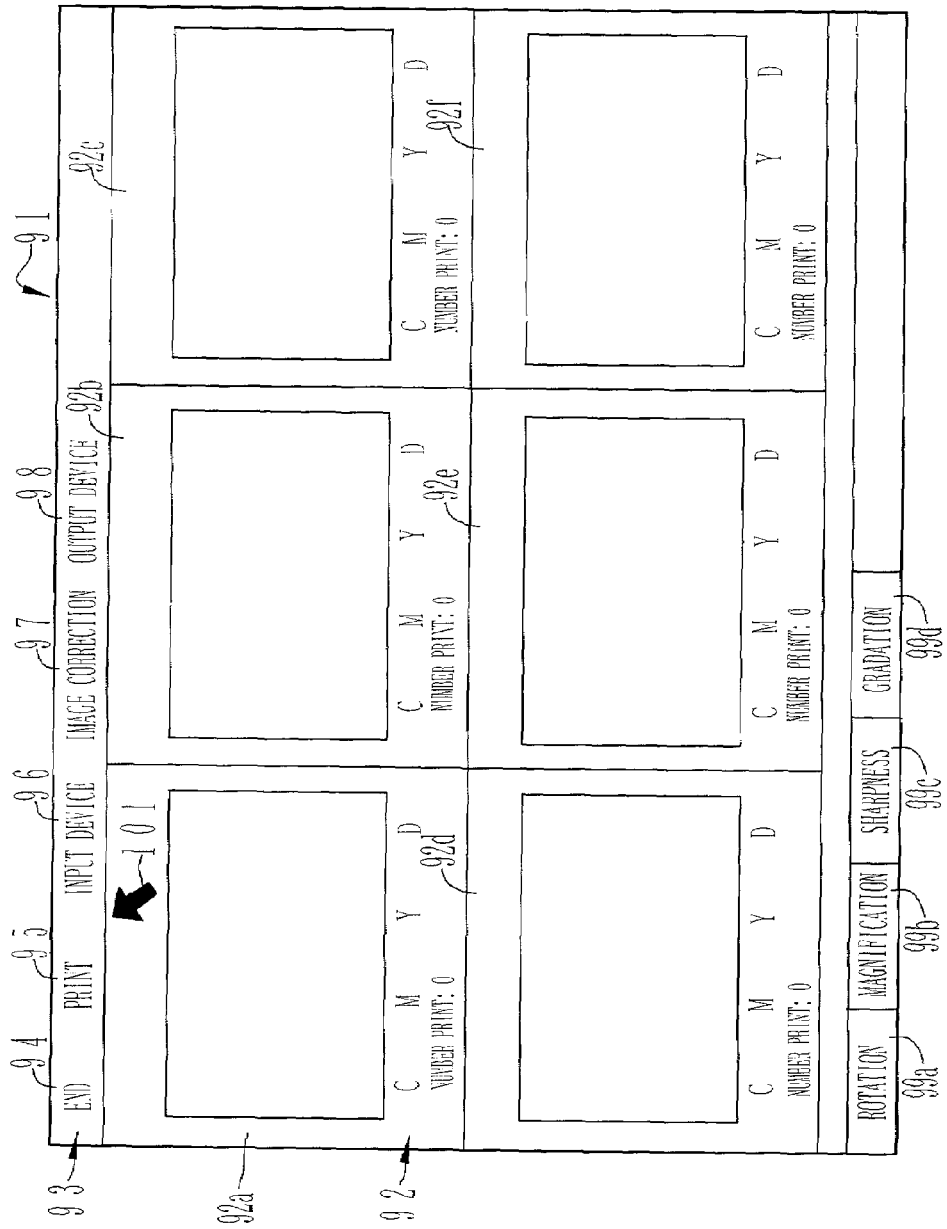
FIG. 11 shows an explanatory diagram illustrating a six-frame observation page.

The display 37 initially displays a menu for choosing between a printing mode and a management mode. The printing mode is for setting up printing conditions and executing the printing. The management mode is for checking the apparatus or registering a template. When the printing mode is selected, a six-frame observation page 91 is displayed as shown in FIG. 11, for displaying six pictures at a time on the basis of image data obtained by the pre-scanning. In an ordinary print mode, the quality and the density of the pictures are controlled with reference to the six-frame observation page 91.

The six-frame observation page 91 is provided with an image display section 92 for displaying six pictures at a time. The image display section 92 is sectioned into six frame display segments 92a, 92b, 92c, 92d, 92e and 92f. As the pictures are pre-scanned, the images of these pictures are displayed on the respective frame display segments 92a to 92f, so the user may designate the print size and the number of prints to make from each picture frame, or may correct color balance or density of each picture frame.

Above the image display section 92 is disposed a control menu display zone 93, in which there are an end button 94 and operation menu buttons, including a print operation menu button 95, an input device operation menu button 96, an image correction menu button 97 and an output device operation menu button 98. Upon clicking a pointer 101 on any of the operation menu buttons 95 to 98, a list of operation menus assigned to the clicked button pops up. Upon clicking the pointer 101 on the end button 94, the print mode is terminated.

Figure 12A:
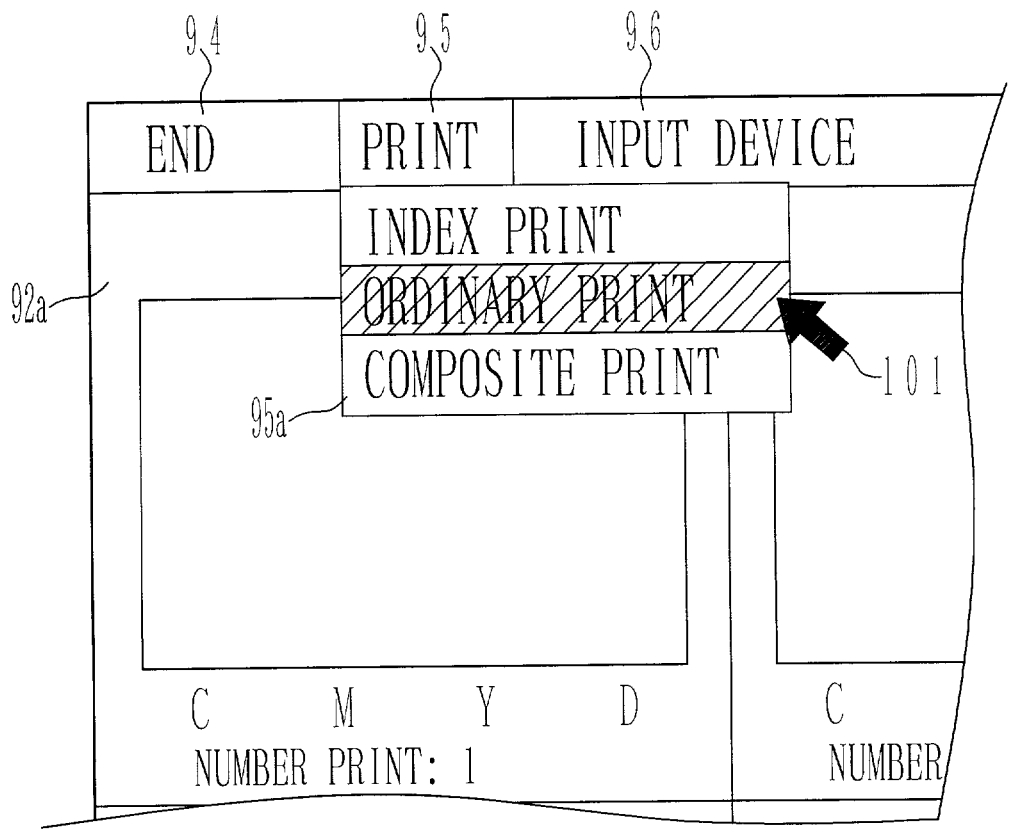
FIGS. 12A and 12B show explanatory diagrams illustrating a print menu list.
Figure 12B:
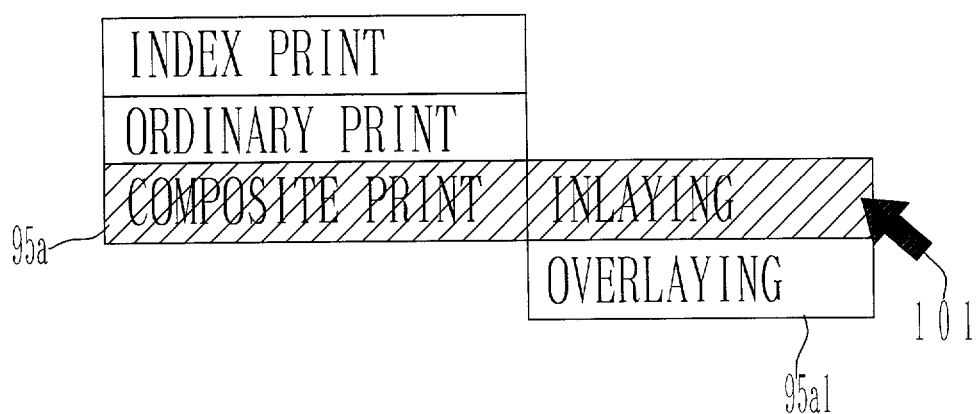

For instance when the print operation menu button 95 is clicked on, a print menu list 95a pops up, as shown in FIG. 12A. The print menu list 95a contains print mode selection buttons for selecting one of the index print mode, the ordinary print mode and the composite print mode. For example, when the pointer 101 is clicked on the composite print mode selection button, a sub-list 95a1 is displayed, as shown in FIG. 12B. Then, the user chooses between the inlay mode and the overlay mode on the sub-list 95a1.

When the input device operation menu button 96 is clicked on, a list of setup buttons for the scanner 3 pops up in the same way as shown with respect to the print menu list 95a in FIG. 12A. Also, when the image correction menu button 97 is clicked on, a list of operation buttons relating to the image correction pops up. When the output device operation menu button 98 is clicked on, a list of setup buttons for the laser printer 5 pops up. The list also includes other buttons, including a switching button for switching over the paper magazines.

Furthermore, an image rotating button 99a, a magnification change button 99b, a sharpness control button 99c and a gradation control button 99d are disposed below the image display section 92.

Figure 13:
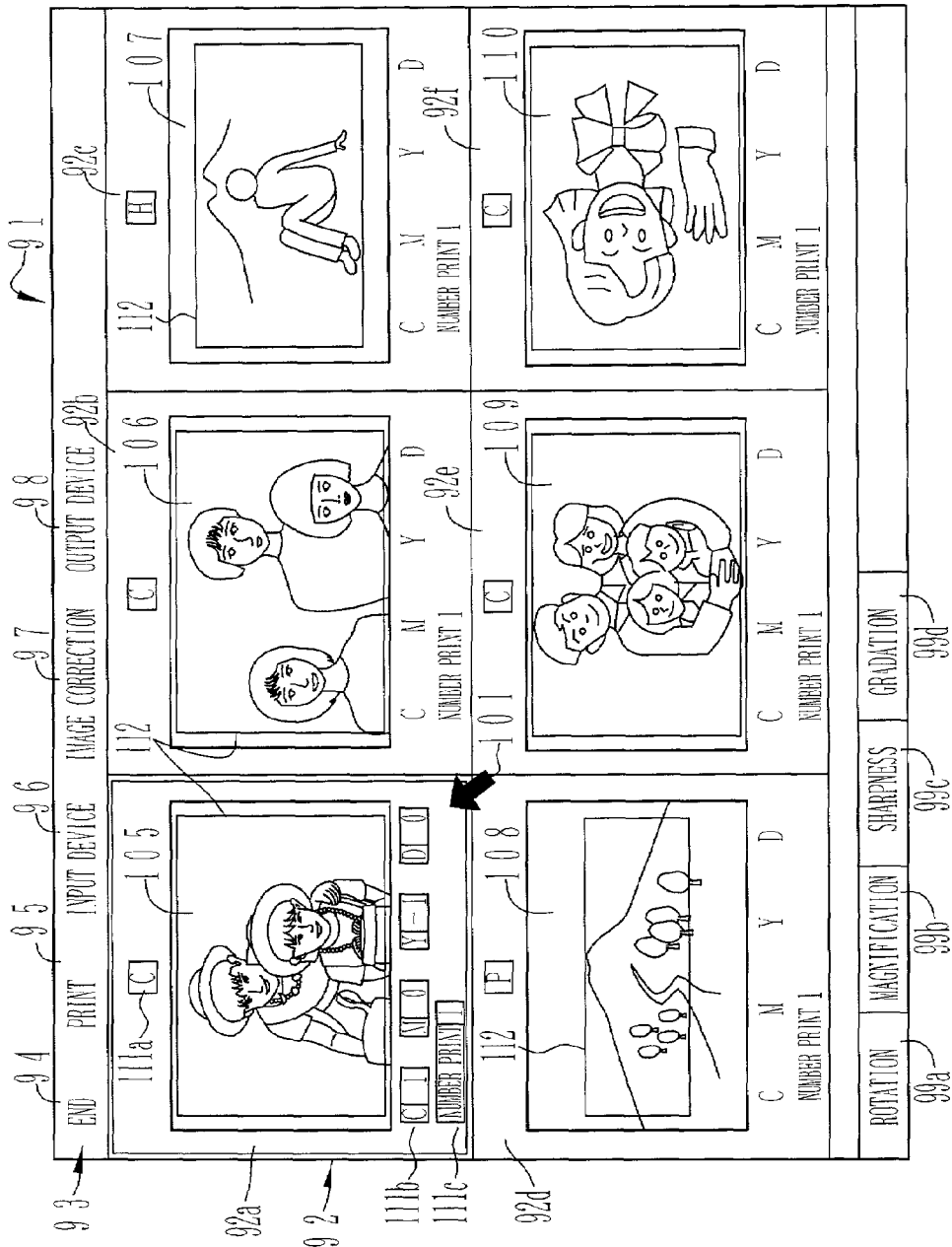
FIG. 13 shows an explanatory diagram illustrating the six-frame observation page displaying six pre-scanned pictures.

When the ordinary print mode is selected and a photo filmstrip is placed in the scanner 3, the scanner 3 starts pre-scanning respective pictures on the photo filmstrip automatically. When the pre-scanning is accomplished, rough images 105, 106, 107, 108, 109, 110 and 101 of six of these pictures are displayed at once in the respective frame display segments 92a to 92f, as shown for example in FIG. 13. When the pointer 101 is clicked in one of the frame display segments 92a to 92f, the clicked frame display segment is distinguished from other segments by displaying a cursor or the like on the clicked segment. Then, a display box 111a for the designated print size, display boxes 111b for the set up color correction values on cyan, magenta and yellow (C, M, Y) and for the density correction value (D), and a display box 111c for the designated print number are displayed in the clicked frame display segment.

In this embodiment, the paper magazine contains color photographic paper of 89 mm wide, and the print size is set to be a C size 89 mm×127 mm in default. To designate another size, the user presses a print size button on the keyboard 41, to display a print size selection menu 121 (see FIG. 14). If the designated print size needs a different paper width, the paper magazine is switched to another type. However, concerning a P size (89 mm×254 mm) and an H size (89 mm×158 mm), as using the same width of photographic paper, it is possible to switch over between the C size, the P size and the H size while displaying the six-frame observation page 91, without the need for displaying the print size selection menu. For example, the keyboard 41 is provided with a specific button for switching over between the C, P and H sizes. After the print size is switched over, the designated print size is displayed in the display box 111$a$.

A boundary 112 showing a print area is displayed in each of the images 105 to 110 displayed in the frame display segments 92$a$ to 92$f$. The print area is determined by the designated print size, so the boundary 112 cooperates with the display box 111$a$. That is, when the print size is changed from the C size to the H size or the P size, the boundary 112 changes correspondingly, as shown on the image 107 and the image 108 in FIG. 13. Thus, the user can visually check the print area corresponding to the designated print size.

As known in the art, an IX240 type photo filmstrip is provided with a data recording area for recording IX data thereon. The IX data is well-known in the art, and includes print size data designating one of the C, P and H sizes. The digital print system 2 reads out the print size data, and sets up the print size automatically according to the print size data. So the display box 111$a$ and the boundary 112 are automatically adjusted to the designated print size.

When the print key of the keyboard 41 is pressed in the ordinary print mode, the scanner 3 carries out the fine-scanning of the six pictures displayed on the six-frame observation page, each at a pixel number that is defined by the designated print size. The image data obtained through the fine-scanning is processed in accordance with the command entered through the image correction menu button 97, the image rotating button 99$a$, the magnification change button 99$b$, the sharpness control button 99$c$ and the gradation control button 99$d$. Thus, the six pictures are printed in response to a print command entered through one operation on the print key in the ordinary print mode.

Figure 14:
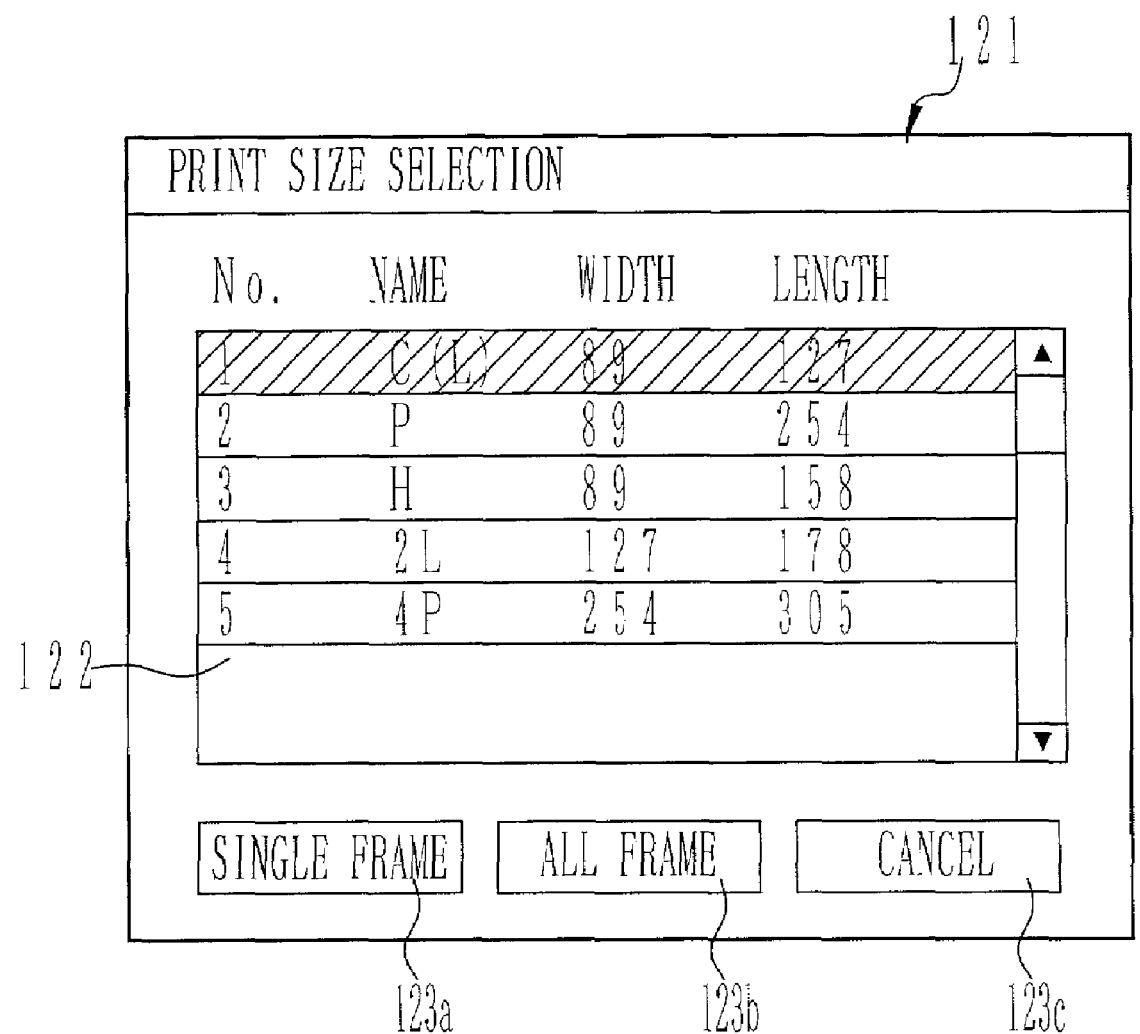
FIG. 14 shows an explanatory diagram illustrating a print size selection menu.

On the other hand, when the inlay mode or the overlay mode is selected, the print size selection menu 121 appears first, as shown in FIG. 14, for allowing to select a print size from among predetermined options, e.g. C size or L size (89 mm×127 mm), P size (89 mm×254 mm), H size (89 mm×158 mm), 2L size (127 mm×178 mm) and 4P size (254 mm×305 mm). The print size options are displayed in a print size selection box 122. Below the print size selection box 122 are disposed a single frame selection button 123$a$, an all frame selection button 123$b$ and a cancel button 123$c$.

When the single-frame button 123$a$ is pressed, the selected print size is applied to a composite image for one time. So long as the all frame selection button 123$b$ is pressed, the same print size is applied to every composite image produced after the selection of that print size. When the cancel button 123$c$ is pressed, the composite print mode is terminated, and the display 37 returns to the initial display condition.

Figure 15:
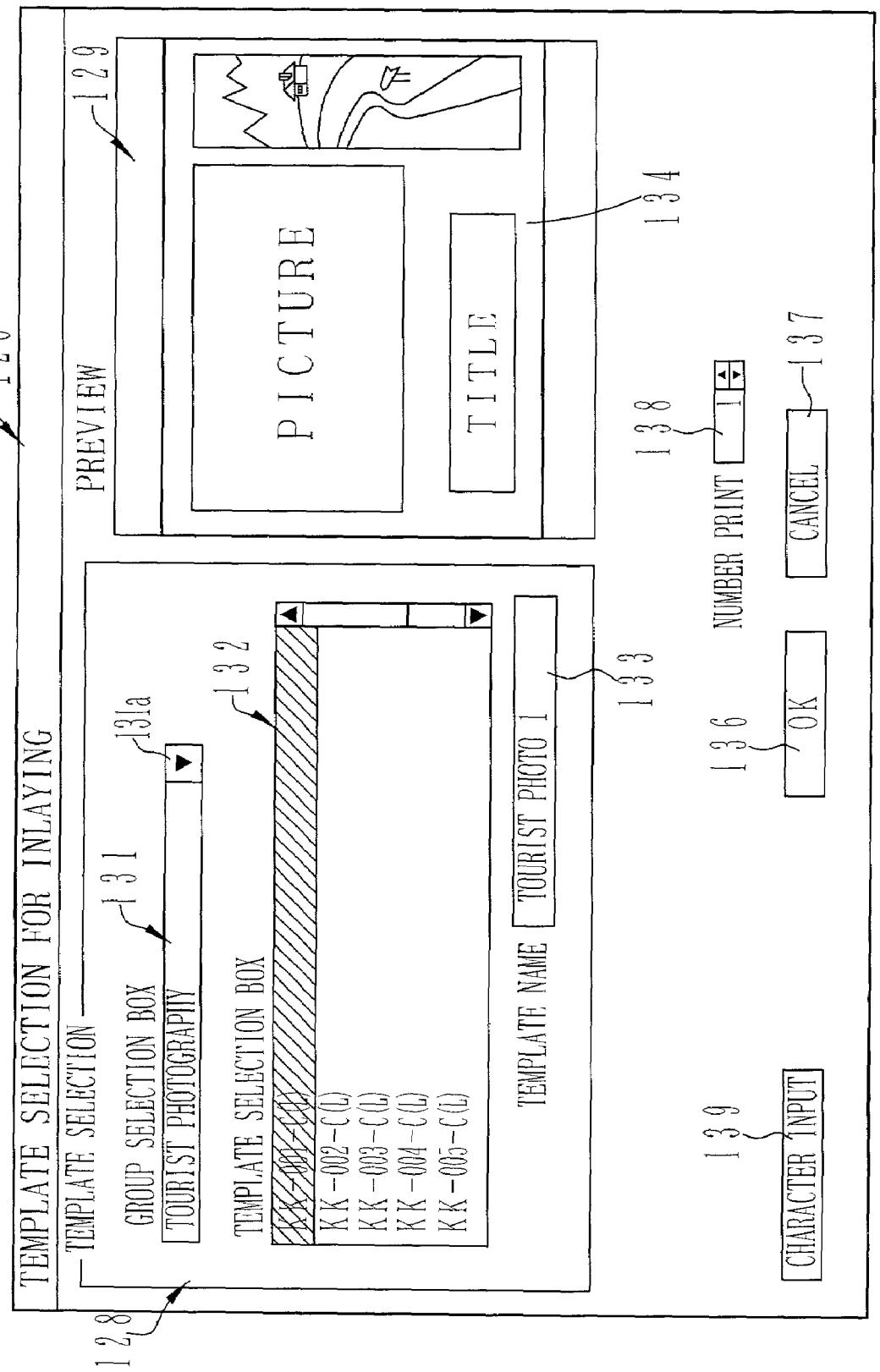
FIG. 15 shows an explanatory diagram illustrating a template selection menu in the inlay mode.
Figure 16:
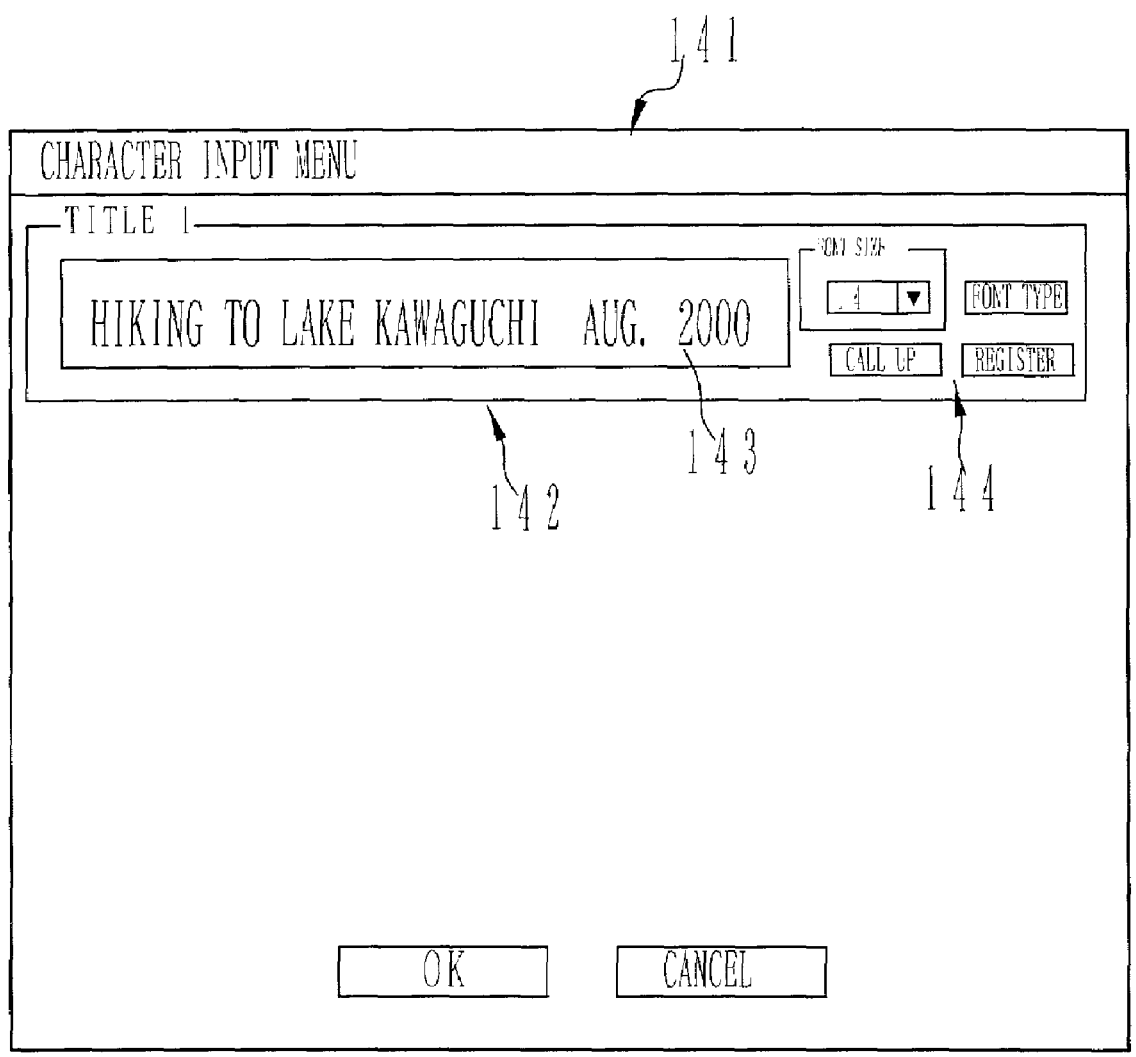
FIG. 16 shows an explanatory diagram illustrating a character input menu.

When the print size is selected on the print size selection menu 121, a template selection menu 126 appears on the screen then, as shown in FIG. 15. The template selection menu 126 is provided with a template selecting section 128 for selecting a template and a preview section 129 for displaying a thumbnail image of the selected template. The template selecting section 128 is provided with a group selection box 131, a template selection box 132 and a template name box 133.

The template selection menu 126 shown in FIG. 15 illustrates an example where the inlay mode is selected, so available group folders included in the inlaying data folder 72 are displayed in the group selection box 131 one after another by pressing an arrow button 131$a$. The template selection box 132 displays ID numbers of those templates which belong to the group selected in the group selection box 131, and are usable for the print size selected on the print size selection menu 121. That is, those templates which are not usable for the selected print size are not displayed in the template selection box, so as to prevent selecting unusable templates. It is alternatively possible to display all the templates of the selected group, and discriminate between usable ones and unusable ones by displaying in different colors from each other.

A cursor is displayed on an appropriate one of the template ID numbers displayed in the template selection box 132, and the name of the template having that ID number is displayed in the template name box 133. Simultaneously, the template having that ID number is displayed as a thumbnail image 134 in the preview section 129. When an OK button 136 is pressed in this condition, the selection of the template designated by the cursor is established.

A cancel button 137 and a print number designation box 138 are provided beside and above the OK button 136 respectively. The print number designation box 138 is for designating the number of prints to make. The cancel button 137 is for resetting the display 37 to the print size selection menu 121.

A character input button 139 is displayed only when a character inlaying range that is defined in the selected template, for inputting characters inside the character inlaying range. This button 139 is not displayed when the selected template does not have a character inlaying range. Upon the character input button 139 being pressed, a character input menu 141 including at least a character input section 142 is displayed. The number of character input boxes depends on the number of the character inlaying ranges included in the selected template. The character input section 142 is provided with an input box 143 and a setting area 144. Characters entered in the input box 143, e.g. "Hiking To Lake Kawaguchi August 2000", are inlaid in the character inlaying range, and thus synthesized with a scanned picture.

The setting area 144 permits designating a font size and a font type, registering fixed or frequently used phrases, like "Happy New Year" and "Merry Xmas", and calling up one of the registered phrases. Data of the registered phrases are stored in the shared folder 72$x$ in this embodiment. The font size and type designated on the setting area 144 have priority to the default font size and type.

Figure 17:
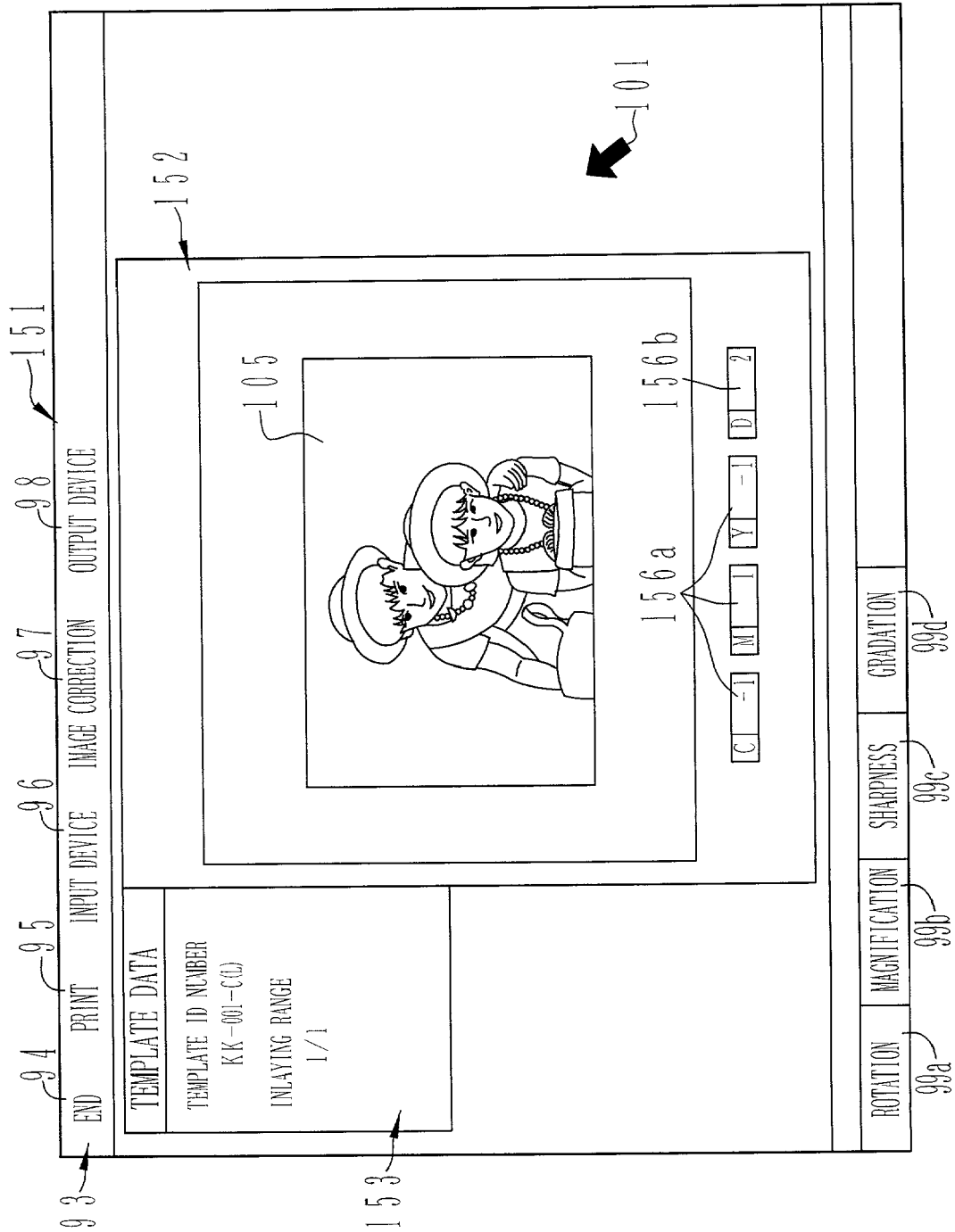
FIG. 17 shows an explanatory diagram illustrating a single frame observation page.

In the inlay mode, when the selection of the template is established by pressing the OK button 136, a single frame observation page 151 is displayed as shown in FIG. 17, and the scanner 3 makes pre-scanning a first picture. The single frame observation page 151 is provided with an image display section 152 and a template data display section 153. The control menu display zone 93 is disposed above the image display section 152, and the image rotating button 99$a$, the magnification change button 99$b$, the sharpness control button 99$c$ and the gradation control button 99$d$ are disposed below the image display section 152, in the same way as in the six-frame observation page 91. An image 105 of the pre-scanned picture is displayed in the image display section 152. The image display section 152 also displays color correction values and a density correction value in data display boxes 156$a$ and 156$b$. The template data display section 153 displays data regarding the selected template, e.g. the template number, the number of inlaying ranges, and the like.

The user can correct the displayed image on the single frame display page 151. Where there are a plurality of pictures to be inlaid in the selected template, these pictures are displayed one by one in the image display section 152 upon each operation on an arrow key of the keyboard 41. By operating an enter key of the keyboard 41, data of the images displayed in the image display section 152 is stored, and the image observation is finished.

Figure 18:
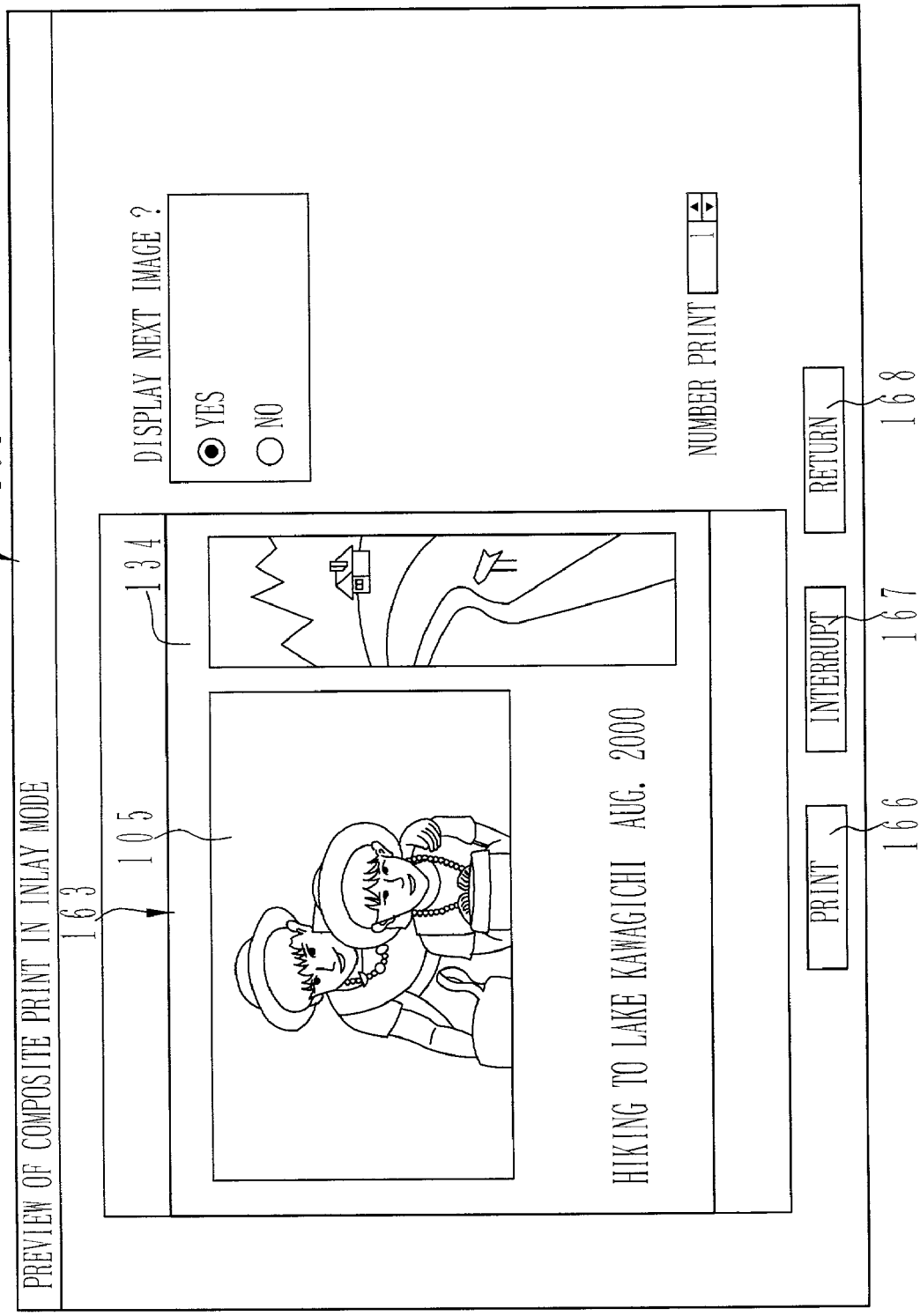
FIG. 18 shows an explanatory diagram illustrating a print preview page.

Then, a print image preview page 161 appears as shown for in FIG. 18. In this instance, the print image preview page 161 displays a preview 163 of a composite image that is obtained by inlaying the pre-scanned image 105 and the characters entered on the character input menu 141 in the selected template 134. In the print image preview page 161, it is possible to designate the print number or decide whether or not to display the preview images of the following pictures. When an interrupt button 167 is pressed, the composite print mode is terminated. When a return button 168 is pressed, the display 37 returns to the preceding display condition. To print out a hard copy of the composite image, the print button 166 is pressed.

When the print button 166 is pressed, the scanner 3 makes fine-scanning the picture as inlaid in the selected template, and the image processing section 4 synthesizes the image data obtained by the fine-scanning with the selected template in accordance with the synthesizing data file 76 of this template. Simultaneously, the display 37 is switched to the single frame observation page 151, and an image of a second picture is displayed. If the second picture is to be inlaid in the same template, the user has only to press the enter key and then the print key, for starting fine-scanning, image-synthesizing and printing.

In this way, so long as the same template is used, it is unnecessary for the user to select the template for the following pictures, so the image synthesizing becomes easier and quicker. Since the contents of the template are defined in the synthesizing data file, and the image synthesizing is carried out with reference to the synthesizing data file, the print quality of the composite image is maintained uniform.

To select another template, the inlay mode is reselected from among the list 95al, as shown in FIG. 12B. When the all frame selection button 123b is already pressed on the print size selection menu 121 (see FIG. 14), the print size selection menu 121 is skipped, and the template selection menu 126 (see FIG. 15) is displayed.

Figure 19:
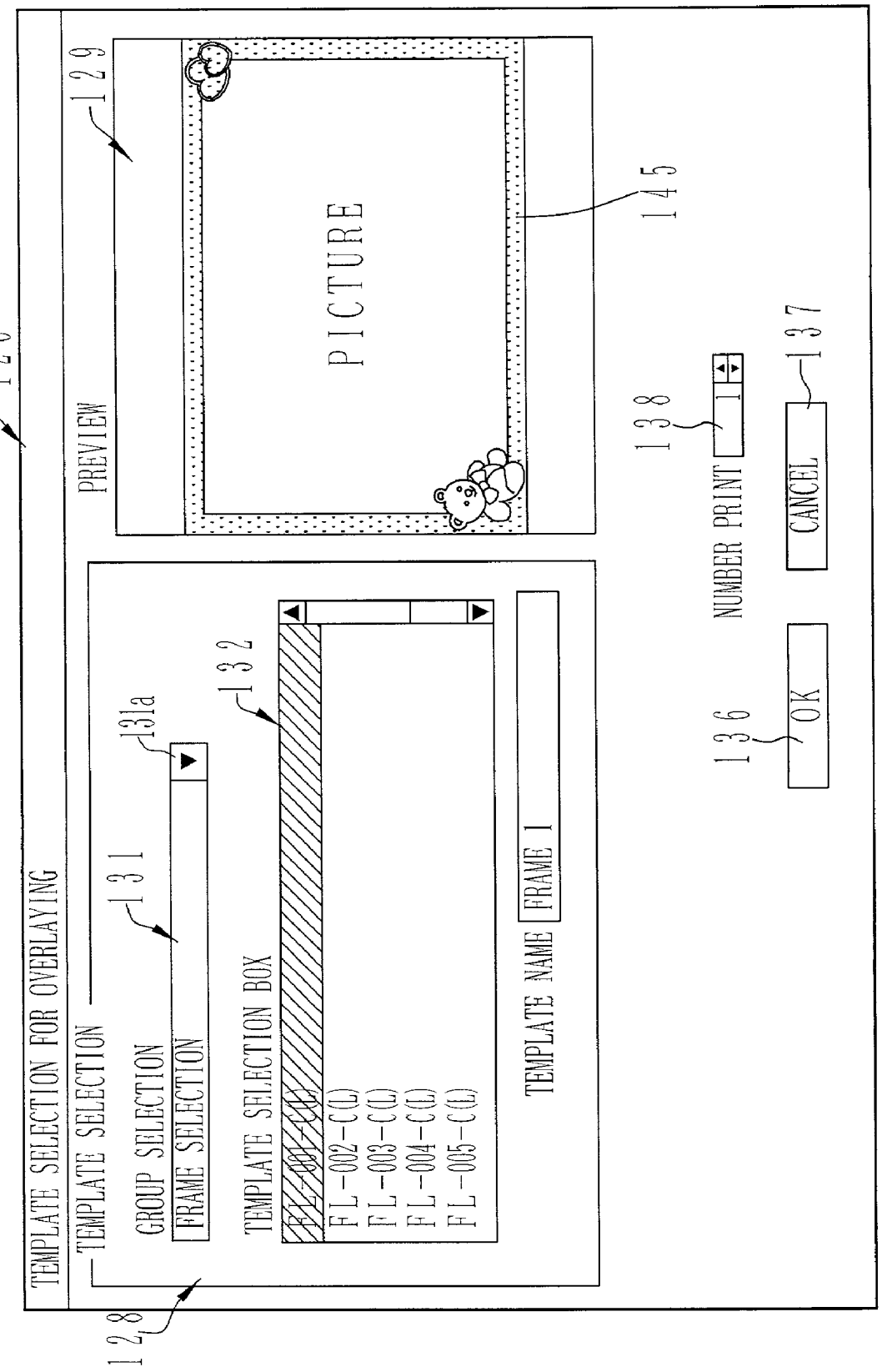
FIG. 19 shows an explanatory diagram illustrating a template selection menu in the overlay mode.

FIG. 19 shows another example of the template selection menu 126 that is displayed in the overlay mode. When the overlay mode is selected, those group folders which are included in the overlaying data folder 73 are displayed one by one in the group selection box 131, and the ID numbers of the template folders belonging to the group displayed in the overlaying data folder 73 is displayed in the template selection box 132. In the same way as in the inlay mode, the preview section 129 displays a thumbnail image 145 of the template selected in the template selection box 132.

Figure 20:
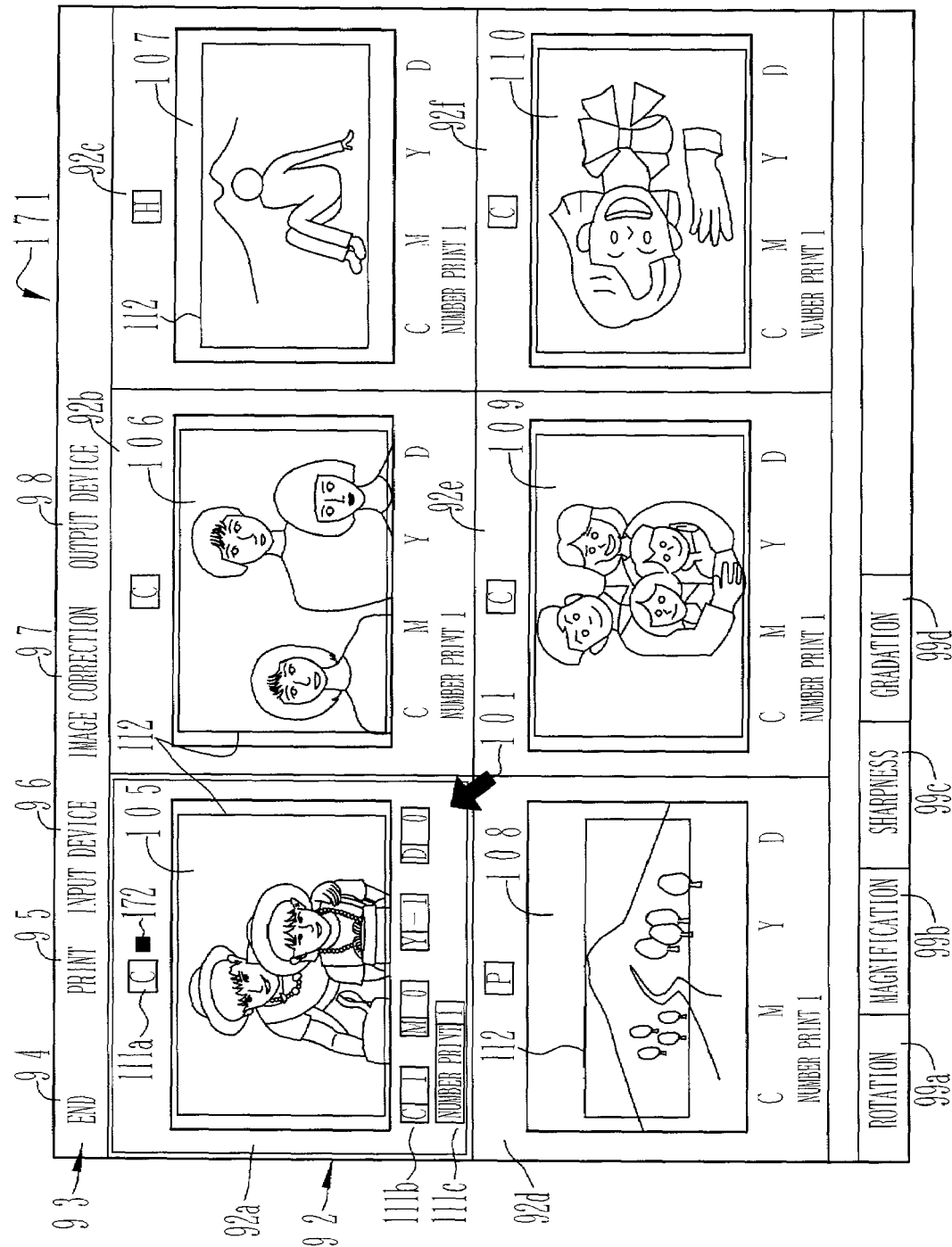
FIG. 20 shows an explanatory diagram illustrating a six-frame observation page in the overlay mode.

When the OK button 136 is pressed on the template selection menu 126 of FIG. 19, the display 37 is switched to a six-frame observation page 171 as shown in FIG. 20. The six-frame observation page 171 for the overlay mod is substantially equivalent to the six-frame observation page 91 for the ordinary print mode, so the same elements are designated by the same reference numerals and the description of these elements are omitted.

In the example shown in FIG. 20, a mark 172 is displayed on the first frame display segment 96a of the six-frame observation page 171, indicating that the image 105 displayed in this frame display segment 96a is to be used for overlaying. When the single frame selection button 123a is pressed on the print size selection menu 121, the mark 172 is displayed in one of the six frame display segments 92a to 92f. On the other hand, when the all frame selection button 123b is pressed, the mark 172 is displayed in the respective frame display segments 92a to 92f.

In this way, designation of which picture is to be used for the image synthesizing is done by pressing the single frame selection button 123a or the all frame selection button 123b on the print size selection menu 121. But it is possible to designate the picture for the overlaying each individually on the six-frame observation menu 171.

Figure 21:
FIG. 21 shows an explanatory diagram illustrating a composite image printed in the overlay mode.

Like the ordinary print mode, six pictures are observed and corrected on the six frame observation page 171, and are printed successively in response to a print command entered through the print key. When the print key is pressed in the overlay mode, the scanner 3 makes fine-scanning at the pixel number determined by the print size, in the same way as in the ordinary print mode. The image data obtained by the fine-scanning is subjected to the image processing in accordance with the commands entered on the six-frame observation page 171. On the basis of the processed image data, a composite image 175 is printed out, as shown for example in FIG. 21.

When the printing of the first six pictures is accomplished, the following six frames are displayed on the six-frame observation page 91. To print these six frames, the same operations are repeated. In this way, it takes as less time to print the images in the overlay mode as in the ordinary print mode.

Like the ordinary print mode, the six-frame observation page 171 permits changing over the print size between the C, P and H sizes. A print size other than the C, P and H sizes may be selected on the print size selection menu 121. The designated print size is applied to those pictures which are not to be synthesized but to be printed independently. As for the composite images, there are prepared those templates for the overlaying which are changeable in print size between the C, P and H sizes. Therefore, those composite images which use the size-changeable templates are printed in the designated size insofar as the designated size is the C, P or H size.

Figure 22A:
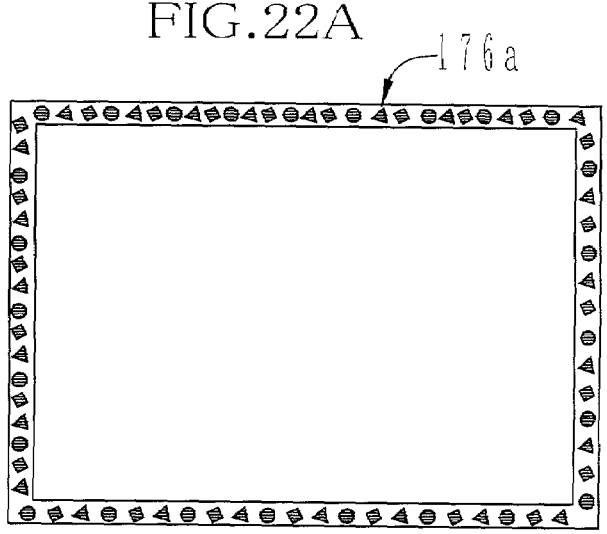
FIGS. 22A, 22B and 22C show explanatory diagrams illustrating three variations of the same framing image contained in a size-changeable template.
Figure 22B:
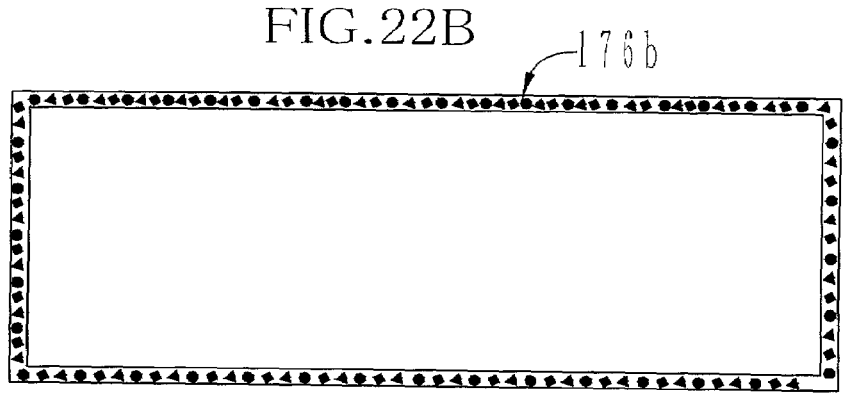
Figure 22C:
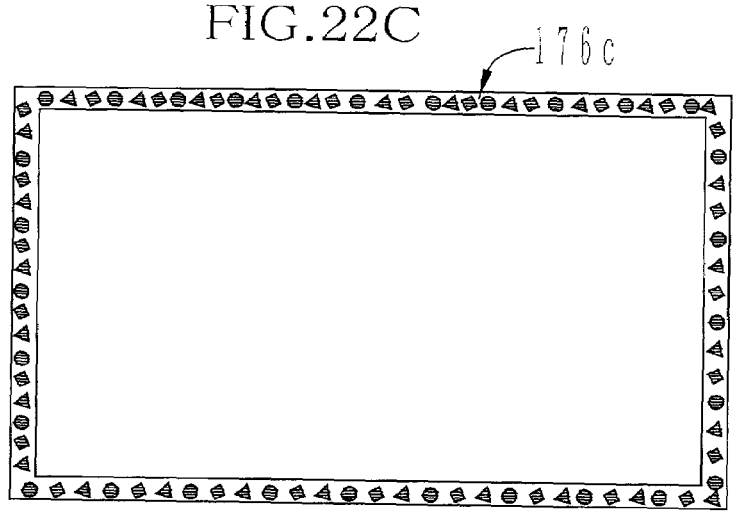
Figure 23:
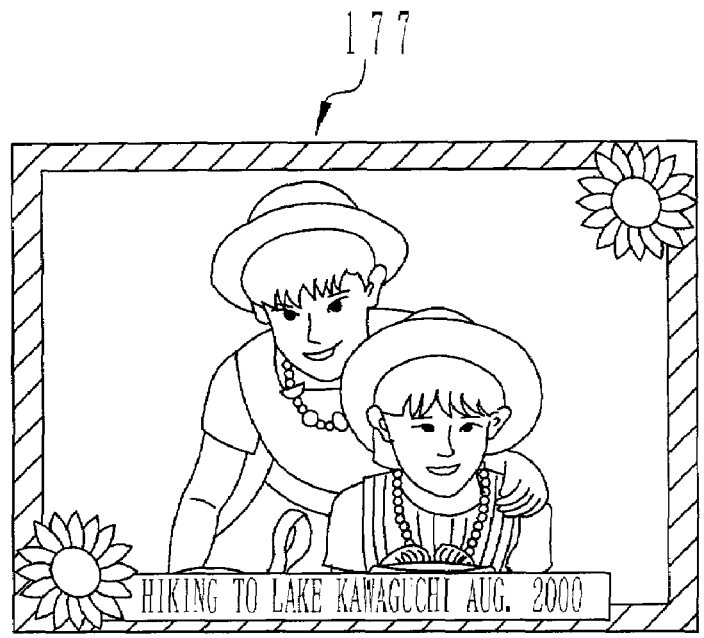
FIG. 23 shows an explanatory diagram illustrating a composite image printed in the overlay mode using a template with a framing image and a character overlaying range.
Figure 24:
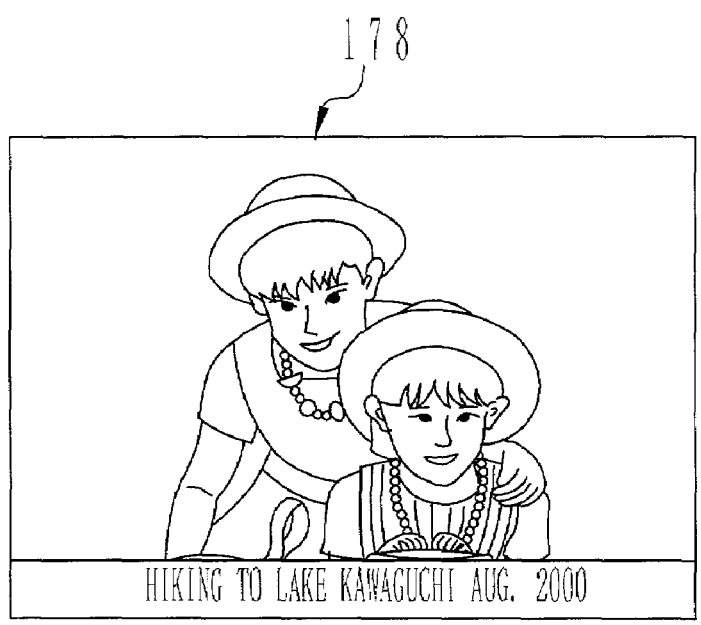
FIG. 24 shows an explanatory diagram illustrating a composite image printed in the overlay mode using a template with a character overlaying range.
Figure 25:
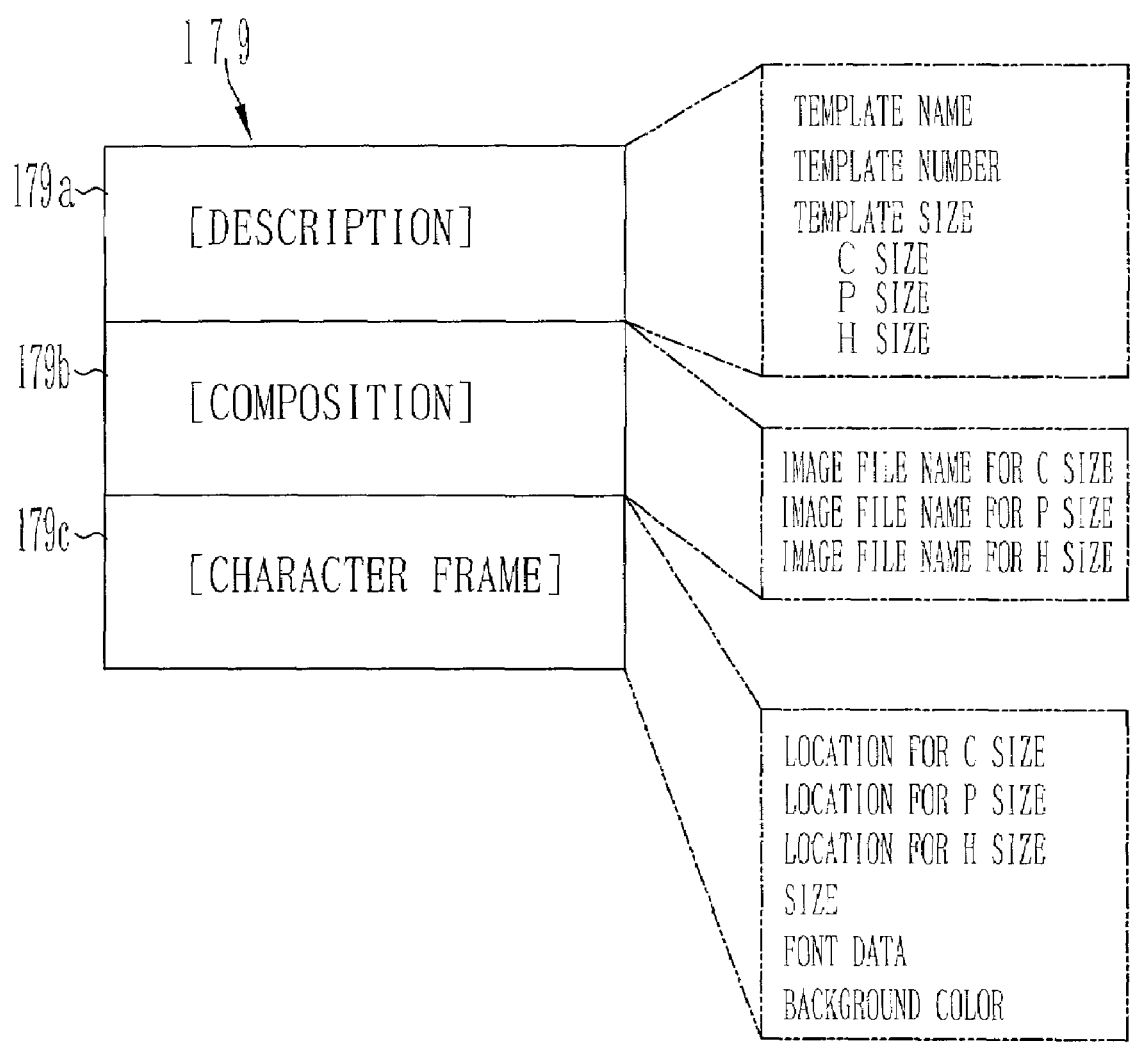
FIG. 25 shows an explanatory diagram illustrating a synthesizing data file for a size-changeable template.
Figure 26:
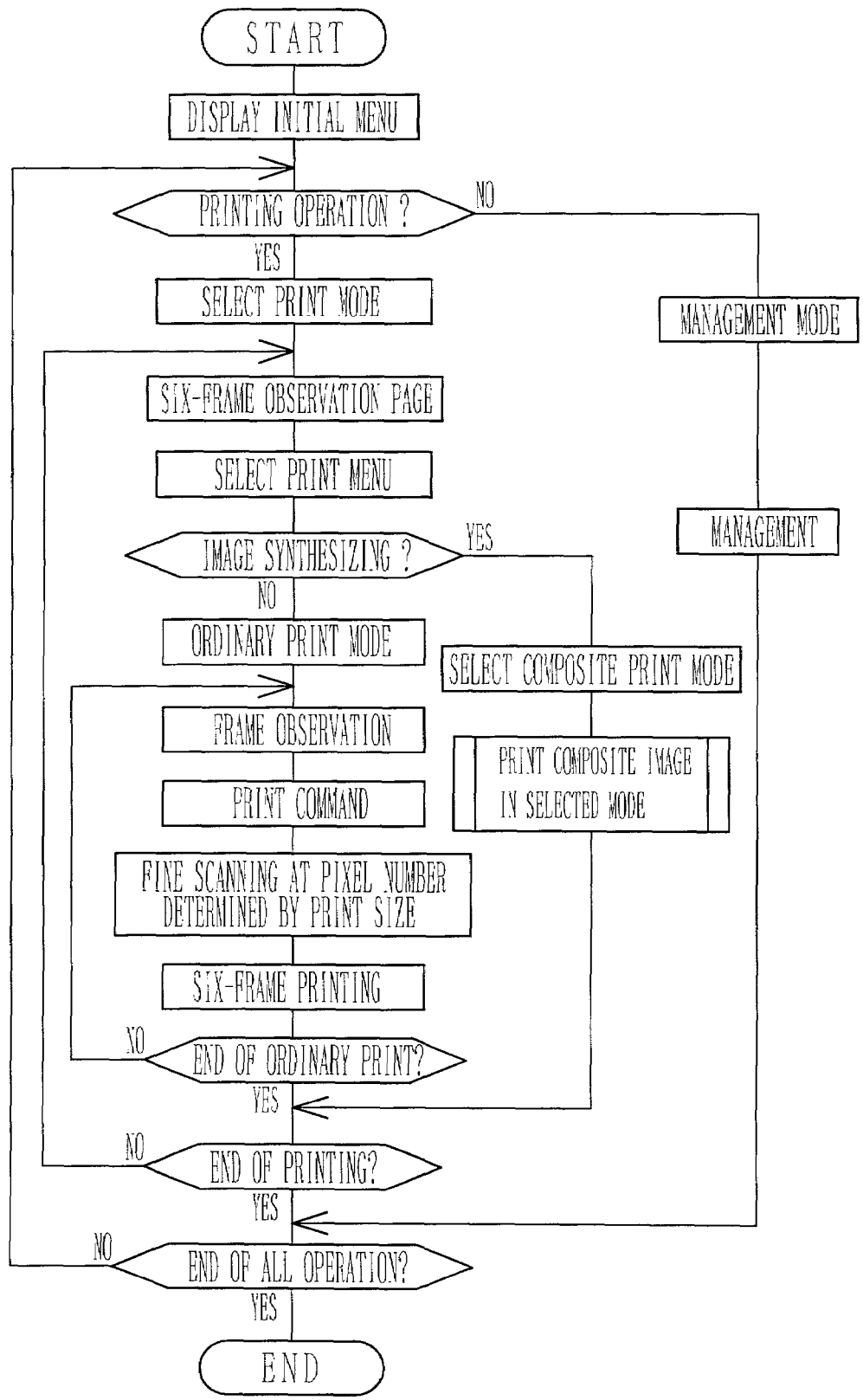
FIG. 26 shows a flow chart illustrating a sequence of printing operation.
Figure 27:
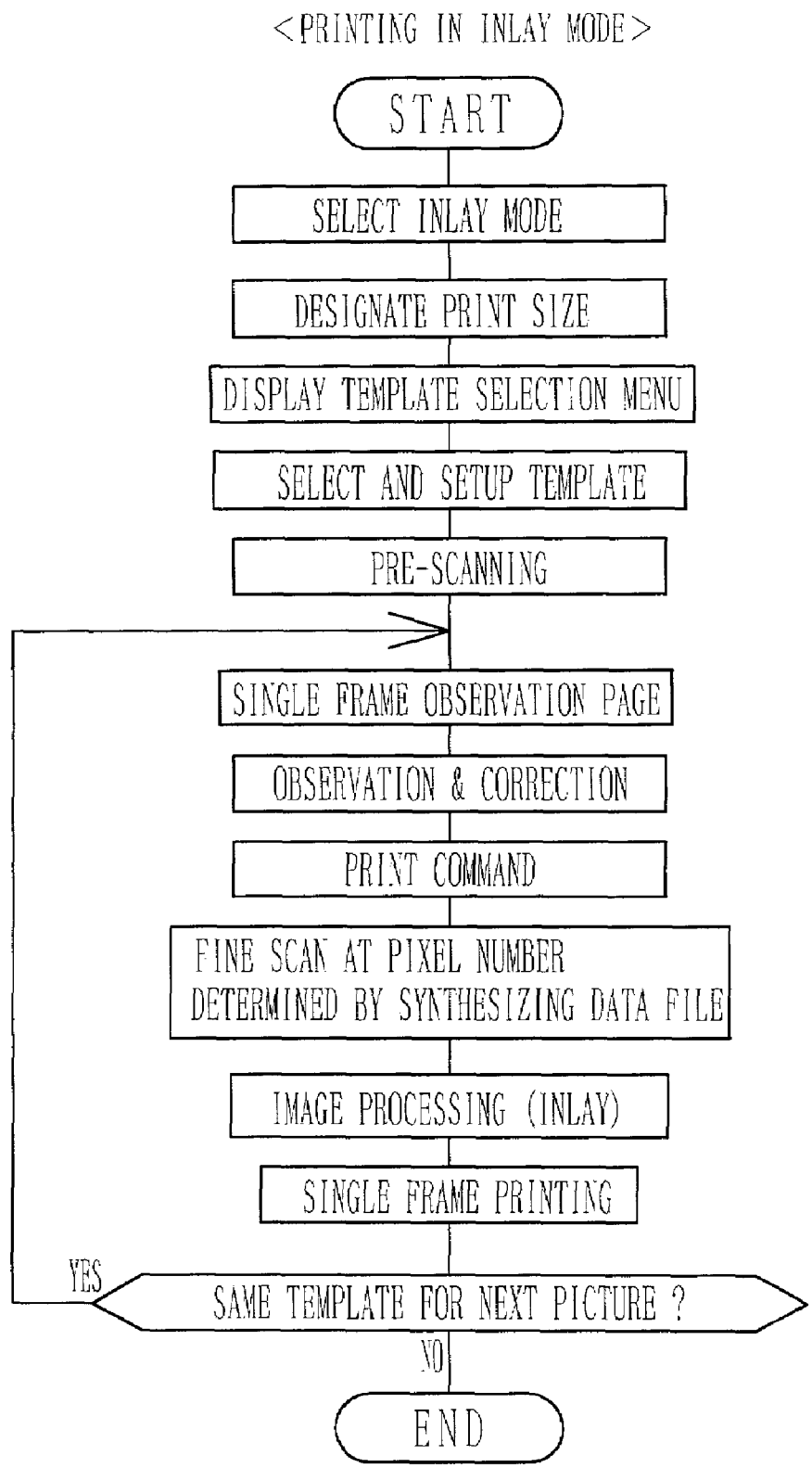
FIG. 27 shows a flow chart illustrating a sequence of printing in the inlay mode.
Figure 28:
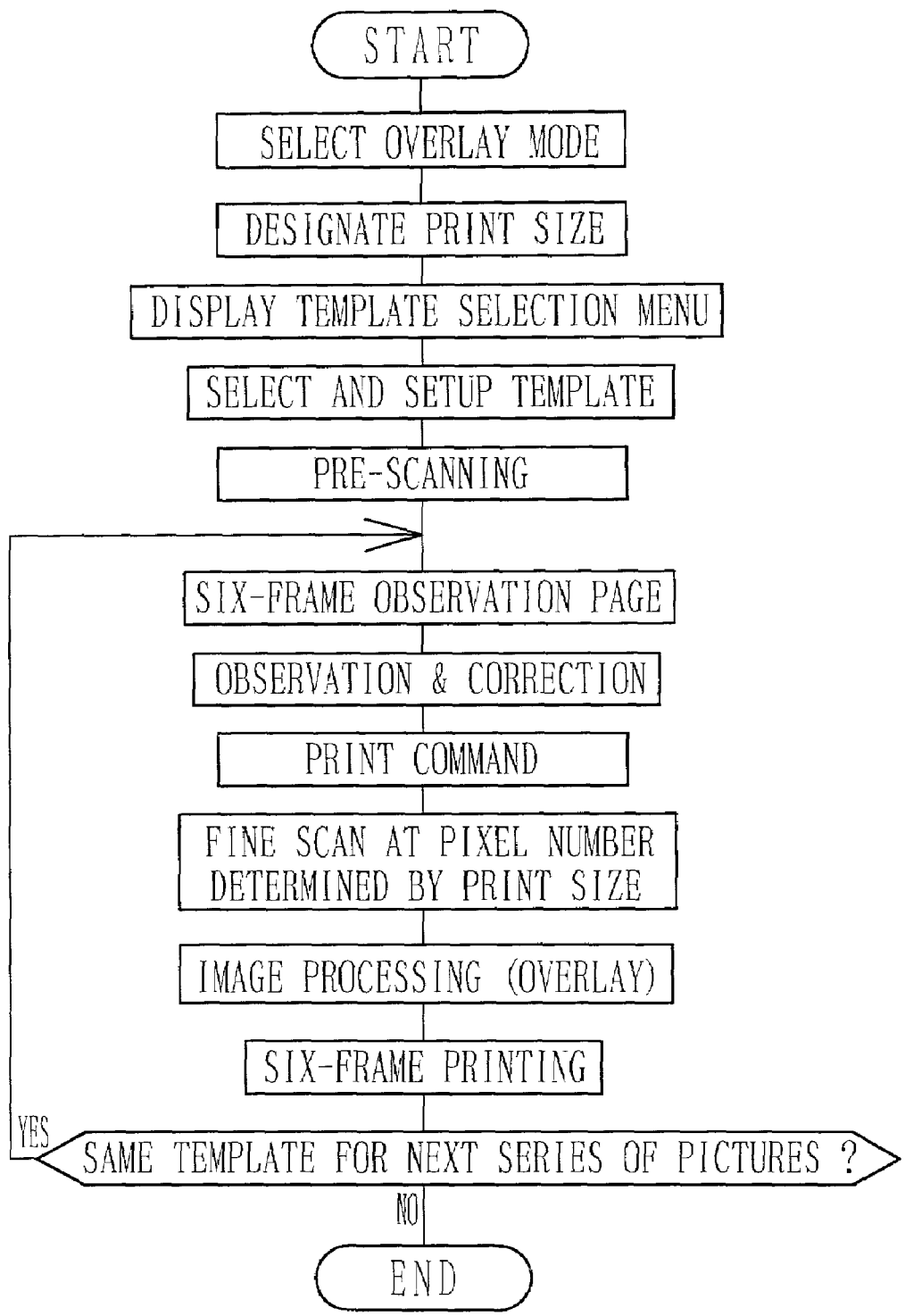
FIG. 28 shows a flow chart illustrating a sequence of printing in the overlay mode.
Figure 29:
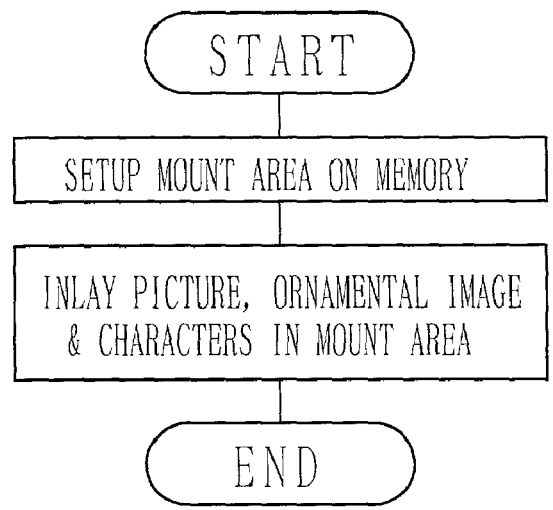
FIG. 29 shows a flow chart illustrating a sequence of image synthesis in the inlay mode.
Figure 30:
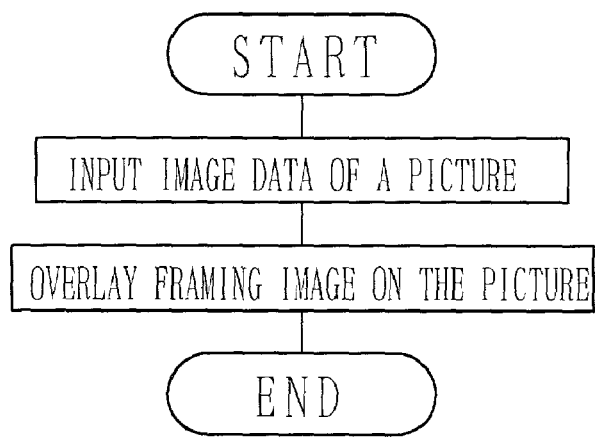
FIG. 30 shows a flow chart illustrating a sequence of image synthesis in the overlay mode.

FIGS. 22A, 22B and 22C show an example of size-changeable template which includes three framing images 176a, 176b and 176c of the C, P and H sizes. In the overlay mode, a caption may be overlaid on a photographic picture in addition to or instead of a framing image, like a composite image 177 as shown in FIG. 23, or a composite image 178 as shown in FIG. 24. FIG. 25 shows a synthesizing data file 179 for such size-changeable template. As the template size, the three print sizes C, P and H are written as data in a description data section 179a, and the respective file names for the three framing images 176a to 176c are written in a composition data section 179b. If the template is provided with a character inlaying range, suitable locations of the character inlaying range for the three print sizes C, P and H are written in a character inlaying range data section 179c. Thus, a suitable one of the framing images 176a to 176c is selected according to the designated print size.

As described so far, in the overlay mode, composite prints may be obtained as easily and quickly as ordinary prints.

Now the overall printing operation will be described with reference to flow charts shown in FIGS. 26 to 30.

To make the printing operation, the printing mode is selected on the initial menu. Otherwise, the management mode is selected on the initial menu.

When the printing mode is selected, the six-frame observation page 91 is displayed. To make the ordinary printing operation, the ordinary print mode is selected on the list 95a. In the ordinary print mode, first six pictures on a photo filmstrip are pre-scanned by the scanner 3, to display the images 105 to 110 of these six pictures on the six-frame observation page 91. When the print key is pressed, the displayed six pictures are printed in continuous succession. Simultaneously, images of the following six pictures are displayed on the six-frame observation page 91. In this way, every six pictures are concurrently observed and printed in the ordinary print mode.

To synthesize the images, the composite print mode is selected on the list 95a, and then the inlay mode or the overlay mode is selected on the sub-list 95a1. When the composite print mode is selected, the print size selection menu 121 is initially displayed regardless of whether it is the inlay mode or the overlay mode. After the print size is selected, the template selection menu 126 is displayed, for the user to select and set up a template.

When the selection and setup of the template is established, the pre-scanning of the first six pictures is executed, so the pre-scanned images are displayed on the six-frame observation page 171. When the print key is pressed after the observation and modification on the six-frame observation page 171, the scanner 3 makes fine-scanning of the pictures at pixel numbers determined by the designated print sizes. Image data of the picture with the mark 172 is written on the synthesizer memory 45. Then the selected framing image or the entered characters are overlaid on the image in the synthesizer memory 45, to produce a composite image. Then, the composite image is printed. Those pictures which have no mark 172 are printed in the same way as for the ordinary printing.

Simultaneously with the print key being pressed, images of the following six pictures are displayed on the six-frame observation page 171. Thus, six pictures are printed in continuous succession upon each operation on the print key.

In the inlay mode, on the other hand, the single frame observation page 151 is displayed when the selection and setup of the template is established by operating the OK button 136 on the template selection menu 126. When the enter key is pressed after making the image correction or the like, the correction values are stored. If the preview of the composite image is designated, the preview menu 161 is displayed in response to the enter key. Thereafter when the print key is pressed, the fine-scanning, the image synthesizing and the printing process are sequentially performed.

In the inlay mode, the fine-scanning is carried out at the pixel number that is defined in the synthesizing data file 76 for inlaying. Simultaneously, the mount area 56 is defined on the synthesizer memory 45 in accordance with the print size. The scanned image, a template image and eventually characters are inlaid on the mount area 56, to produce image data of a composite image, and the composite image is printed on the basis of the image data produced in the synthesizer memory 45. Simultaneously, an image of the next picture is displayed on the single frame observation page 151. If the same template is used for the next picture, the user just press the print key. To change the template, the user reselects the inlay mode.

Figure 31:
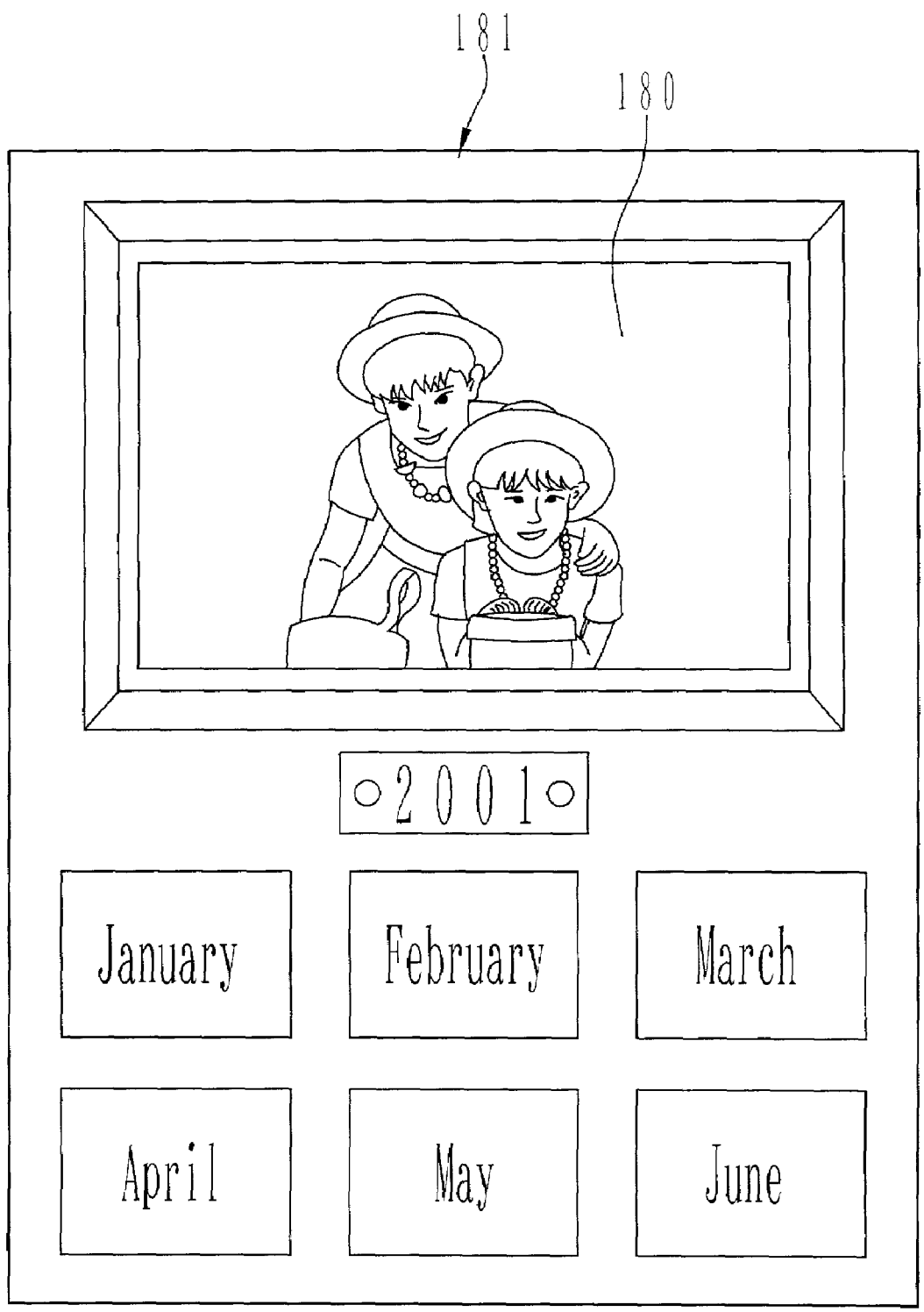
FIG. 31 shows an explanatory diagram illustrating a composite image printed as a calendar using a template in the inlay mode.
Figure 32:
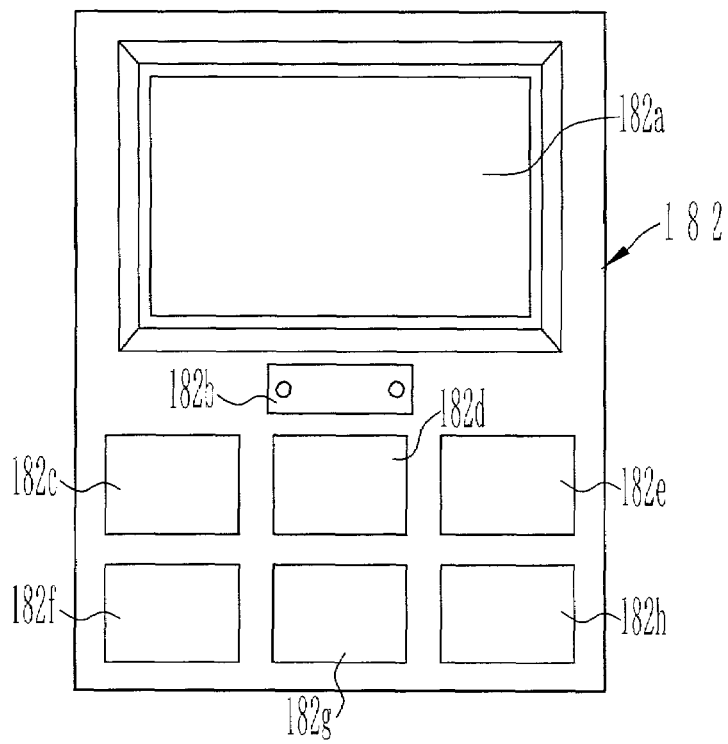
FIG. 32 shows an ornamental image of the template used for producing the calendar shown in FIG. 31.
Figure 33:
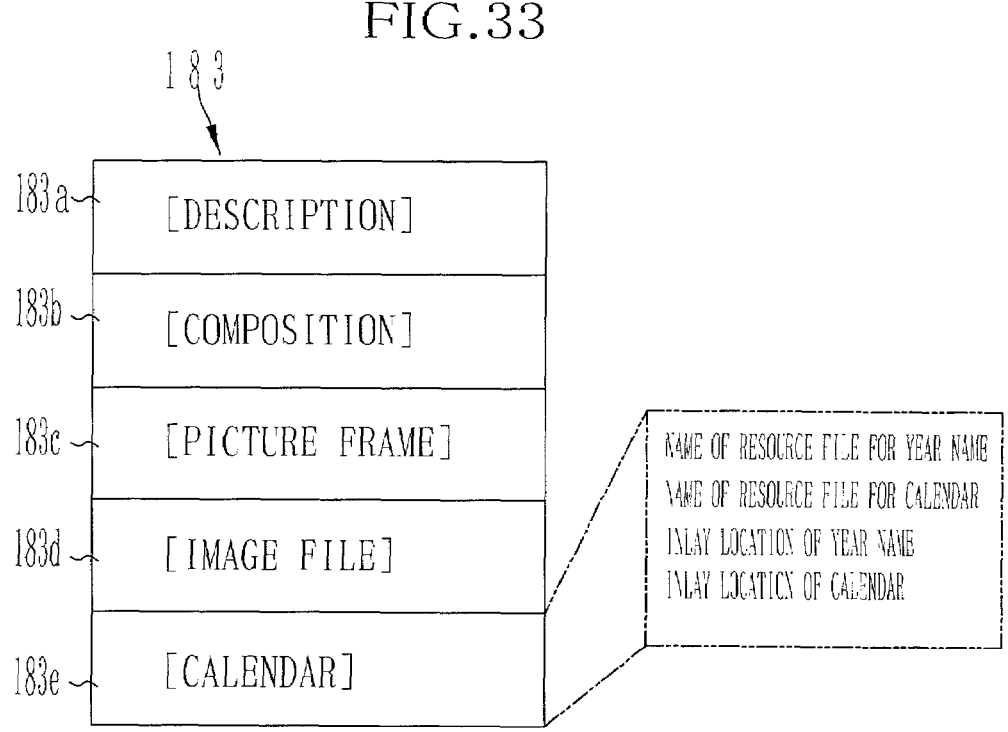
FIG. 33 shows an explanatory diagram illustrating a synthesizing data file of the template for the calendar.

FIG. 31 shows a composite image 181 formed in the inlay mode. The composite image 181 is an example where a photographic picture 180 is synthesized with a template for calendar. The template used for the composite image 181 consists of an ornamental image 182 as shown in FIG. 32, and a synthesizing data file 183 as shown in FIG. 33. The ornamental image 182 is provided with a window 182a for inlaying the photographic picture 172 therein, a year-frame 182b, and six month-frames 182c, 182d, 182e, 182f, 182g and 182h. The name of a year and calendar data of that year are contained in specific resource files that are stored in the shared folder 72x.

The synthesizing data file 183 is provided with a description data section 183a, a composition data section 183b, a picture inlaying range data section 183c, an ornamental image data section 183d and a calendar data section 183e. The calendar data section 183e stores the name of the resource files containing the designated name of the year and the calendar data of that year, location data for inlaying the name of the year and the dates of the respective months in the year-frame 182b and the month-frames 182c to 182h. The resource file for the name of the year and the calendar resource file for the calendar data is selected from among a variety of options that are prepared in accordance with the font and the color of characters, and the like. The calendar resource file also contains designation of what color is to be used for Saturdays or Sundays.

Figure 34:
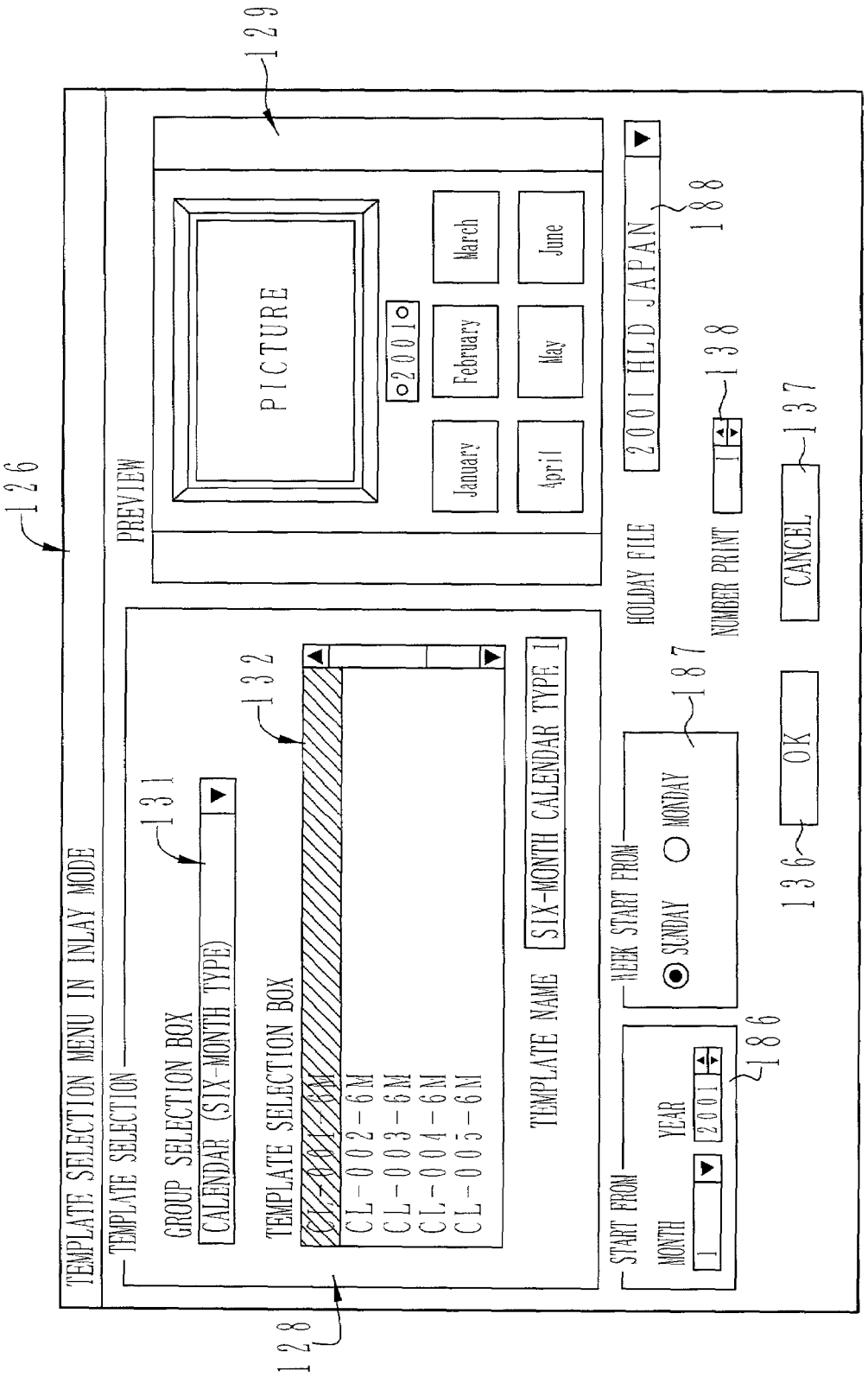
FIG. 34 shows an explanatory diagram illustrating a condition of the template selection menu as displayed when the template for the calendar is selected.

When the template for the calendar 182 is selected on the template selection menu 126, as shown in FIG. 34, a box 186 for designating the year and the month to start from on the calendar, and a box 187 for designating which day of the week the respective week should start from on the calendar. Also a box 188 for designating a holiday file is displayed on the template selection menu 126. The holiday file is a resource file containing data of holidays of each year for each country or state. The holiday file is stored in the shared folder 72x in this embodiment.

Since the calendar data are stored for each month of each year as the resource files that may be shared by a plurality of calendar templates, the ornamental image itself is not required to have the calendar data. Accordingly, the same ornamental image may be used repeatedly for different years, without the need for reregistering the ornamental image for a new year. This saves the data volume and simplifies the data maintenance.

Figure 35:
FIG. 35 shows an explanatory diagram illustrating a composite image where the same picture is inlaid in a plurality of picture inlaying ranges.
Figure 36:
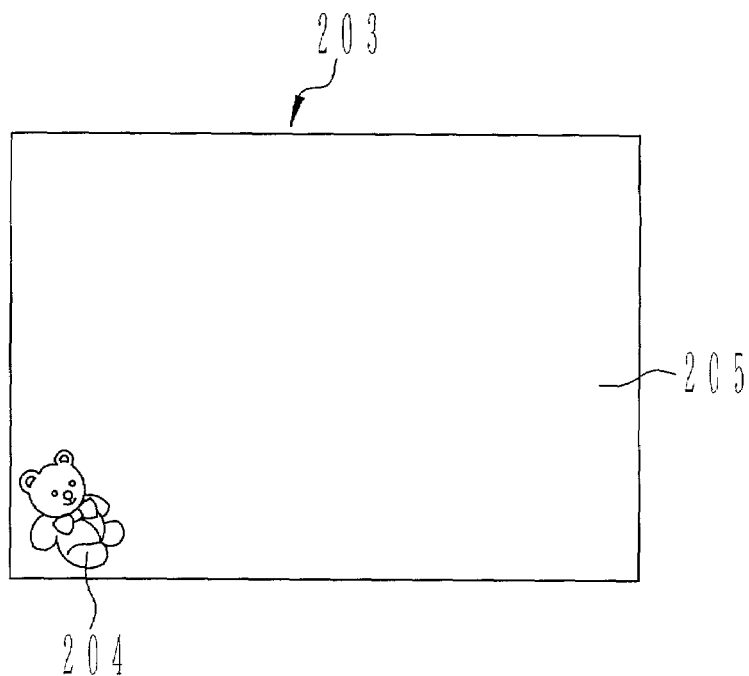
FIG. 36 shows an explanatory diagram illustrating an additional image with an illustration spot.
Figure 37:
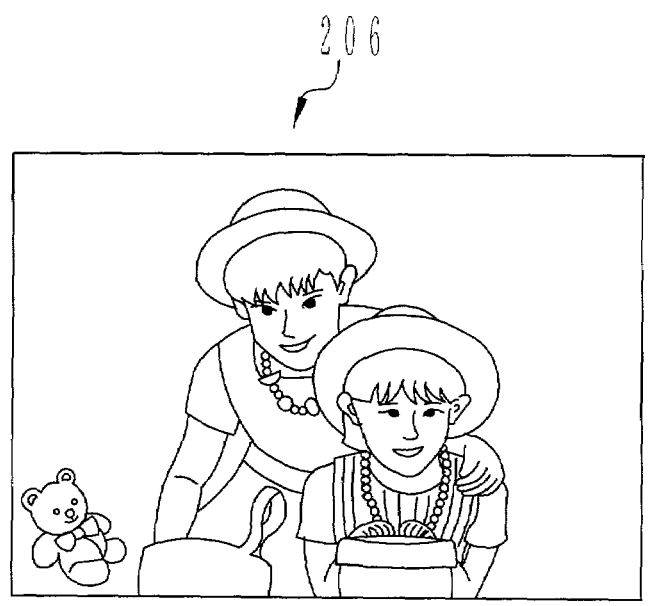
FIG. 37 shows an explanatory diagram illustrating a composite image produced by overlaying the additional image of FIG. 36 on a scanned picture.

FIG. 35 shows another composite image 189 that is formed by inlaying the same photographic picture 180 in three picture inlaying ranges of different sizes, without using any ornamental image. A synthesizing data file for this template is provided with three picture inlaying range data sections designating the respective sizes and locations of the three inlaying ranges. It is of course possible to designate the three inlaying ranges to have the same size.

As described so far, the inlay mode permits designating complicated conditions for the image synthesizing, so it is possible to produce a picture-inlaid calendar, like the composite image 181, or synthesize a photographic picture in a smaller size than the whole size of the composite image, like the composite image 189.

An additional image available in the overlay mode is not limited to a framing image. For example, the additional image may be an image 203 with an illustration spot 204, as shown in FIG. 38. The outline size of the additional image 203 is equal to the print size, and an area 205 other than the illustration spot 204 constitutes an opening. By overlaying this additional image 203 on the photographic picture 180, a composite image 206 shown in FIG. 39 is produced. The illustration spot 204 may have many variations in content, in size, in location and the like.

Although the present invention has been described with reference to the drawings, the templates applicable to the present invention are not to be limited to the illustrated ones, but there are many kinds of templates applicable to the present invention. In the above embodiments, the size of the overlaid image is defined to be equal to the outline size of the scanned image. But it is possible to overlay a smaller additional image than the scanned image on a predetermined area of the scanned image.

Although the scanner 3 of the above embodiment is directed to scan photographic pictures from photographic filmstrips, the input unit 7 may be provided with a reflective scanner for picking up image data from opaque originals, or a card reader for reading out image data from a memory card.

Instead of the laser printer 5, the output unit 8 may be provided with a thermal printer, an ink-jet printer or another type of printer.

Thus, the present invention is not to be limited to the above embodiments but, on the contrary, various modifications will be possible to those skilled in the art, without departing from the scope of claims appended hereto.

What is claimed is:

1. An image synthesizing apparatus for synthesizing a subject image with at least an additional image to produce a composite image, comprising:
    an image input device for inputting image data of said subject image into a memory;
    an image processing device for processing said image data to synthesize said subject image with at least an additional image; and
    a mode switching device for switching over said image synthesizing apparatus between an overlay mode and an inlay mode, wherein, in said overlay mode, said image data of said subject image is input into said memory in a size corresponding to a designated print size of said composite image, and at least an additional image is overlaid on a predetermined portion of said subject image, whereas, in said inlay mode, a mount area is defined in said memory in correspondence with a designated print size of said composite image, and said subject image and at least an additional image are inlaid in those ranges which are defined in variable sizes at appropriate locations within said mount area, wherein in said overlay mode, an outer perimeter of said at least an additional image is equal to said subject image in shape such that the outer perimeter of the subject image and outer perimeter of said additional image are aligned where a reference point of said at least an additional image overlaps an origin of said subject image to align the additional image and subject image.

2. An image synthesizing apparatus as recited in claim 1, wherein said image processing device processes said image data of said subject image on the basis of a template selected from among a plurality of templates.

3. An image synthesizing apparatus as recited in claim 2, wherein said templates comprise templates which are prepared in correspondence with a plurality of kinds of additional images available in said overlay mode, and templates for use in said inlay mode each of which is produced for each composite image to define the print size of said composite image, and the sizes and locations of said subject image and at least an additional image within said composite image.

4. An image synthesizing apparatus as recited in claim 3, wherein said additional images available for said overlay mode comprise those images which are each constituted of a transparent portion for partly exposing said subject image and an ornamental image portion to be superimposed on said subject image.

5. An image synthesizing apparatus as recited in claim 4, wherein said ornamental image portions comprise images to frame said subject image.

6. An image synthesizing apparatus as recited in claim 2, wherein said templates comprise templates defining at least a character inlaying range for inlaying characters in said composite image.

7. An image synthesizing apparatus as recited in claim 2, wherein when the same template is selected to be used for a plurality of subject images in said overlay mode, said image input device inputs image data of said plurality of subject images in continuous succession in response to a command, and said image processing device processes said image data of said subject images on the basis of said same template to produce a plurality of composite images successively.

8. An image synthesizing apparatus as recited in claim 1, wherein said image input device comprises a scanner for picking up image data from an original.

9. An image synthesizing apparatus as recited in claim 8, wherein said scanner comprises a film scanner that picks up image data from pictures photographed on a photographic film.

* * * * *